United States Patent
Krijn et al.

(10) Patent No.: US 10,172,296 B2
(45) Date of Patent: Jan. 8, 2019

(54) METHOD FOR ENHANCING THE NUTRITIONAL VALUE IN AN EDIBLE PLANT PART BY LIGHT, AND LIGHTING DEVICE THEREFORE

(71) Applicant: PHILIPS LIGHTING HOLDING B.V., Eindhoven (NL)

(72) Inventors: Marcellinus Petrus Carolus Michael Krijn, Eindhoven (NL); Paulus Albertus Van Hal, Eindhoven (NL); Gabriel-Eugen Onac, Eindhoven (NL); Cristina Tanase, Eindhoven (NL)

(73) Assignee: PHILIPS LIGHTING HOLDING B.V., Eindhoven (NL)

(*) Notice: Subject to any disclaimer, the term of this patent is extended or adjusted under 35 U.S.C. 154(b) by 355 days.

(21) Appl. No.: 14/425,435

(22) PCT Filed: Aug. 30, 2013

(86) PCT No.: PCT/IB2013/058159
§ 371 (c)(1),
(2) Date: Mar. 3, 2015

(87) PCT Pub. No.: WO2014/037860
PCT Pub. Date: Mar. 13, 2014

(65) Prior Publication Data
US 2015/0223402 A1 Aug. 13, 2015

Related U.S. Application Data

(60) Provisional application No. 61/696,514, filed on Sep. 4, 2012.

(51) Int. Cl.
*A01G 7/04* (2006.01)
*F21V 23/04* (2006.01)
(Continued)

(52) U.S. Cl.
CPC .......... *A01G 7/045* (2013.01); *F21V 23/0442* (2013.01); *F21W 2131/30* (2013.01);
(Continued)

(58) Field of Classification Search
CPC ............. A01G 7/045; A01G 7/00; A01G 7/04
See application file for complete search history.

(56) References Cited

U.S. PATENT DOCUMENTS

2007/0151149 A1 7/2007 Karpinski
2010/0031562 A1 2/2010 Browne
(Continued)

FOREIGN PATENT DOCUMENTS

CN 102144503 A 8/2011
GB 2444082 A 5/2008
(Continued)

OTHER PUBLICATIONS

Ultraviolet Lighting for Vegetables, Enhancing the Vitamin C and Vitamin E Content, FFTC Practical 2003, Technology.
(Continued)

*Primary Examiner* — Kristen C Hayes

(57) ABSTRACT

The invention provides a method for enhancing the nutritional value in a first plant part (2) of a crop (1), wherein the first plant part (2) comprises an edible plant part, wherein the crop (1) in addition to the first plant part (2) comprises one or more other plant parts (3), wherein the method comprises illuminating during a nutritional enhancement lighting period a target part (5) of said first plant part (2) with horticulture light (511) that is selected to enhance formation of a nutrient in said first plant part (2) while allowing one or more other plant parts (3) to be subjected to different light conditions, wherein the nutritional enhancement lighting period is started within two weeks from harvest of the first plant part (2).

12 Claims, 9 Drawing Sheets

(51) Int. Cl.
*F21W 131/30* (2006.01)
*F21Y 105/10* (2016.01)
*F21Y 115/10* (2016.01)

(52) U.S. Cl.
CPC ....... *F21Y 2105/10* (2016.08); *F21Y 2115/10* (2016.08); *Y02P 60/146* (2015.11)

(56) References Cited

U.S. PATENT DOCUMENTS

| 2011/0115385 A1 | 5/2011 | Waumans |
| 2012/0170264 A1 | 7/2012 | McKenzie |
| 2015/0121753 A1* | 5/2015 | Jenner .................... A01G 7/045 47/58.1 LS |

FOREIGN PATENT DOCUMENTS

| JP | 8205677 A | 8/1996 |
| JP | 2007267668 A | 10/2007 |
| WO | 2008048080 A1 | 4/2008 |
| WO | 2008065352 A1 | 6/2008 |
| WO | 2011154522 A1 | 12/2011 |

OTHER PUBLICATIONS

Ohashi-Kaneko, Keiko et al "Effect of Light Quality on Growth and Vegetable uality in Leaf Lettuce, Spinach and Komatsuna", Environmental Control Biology, vol. 45, No. 3, 2007, pp. 189-198.

Dorais, Martine "The Use of Supplemental Lighting for Vegetable Crop Production: Light Intensity, Crop Response, Nutrition, Crop Management, Cultural Practices", Greenhouse Talks 2007.

Urbonaviciute, Akvile et al "The Effect of Light Quality on the Antioxidative Properties of Green Barely Leaves", Scientific Works of the Lithuanian Institute of Horticulture and Lithuanian University of Agriculture, 2009.

Bliznikas, Z. et al, "Solid-State Lamp for the Improvement of Nutritional Quality of Leafy Vegetables", Electronics and Electrical Engineering, ISSN 1392-1215, 2009.

* cited by examiner

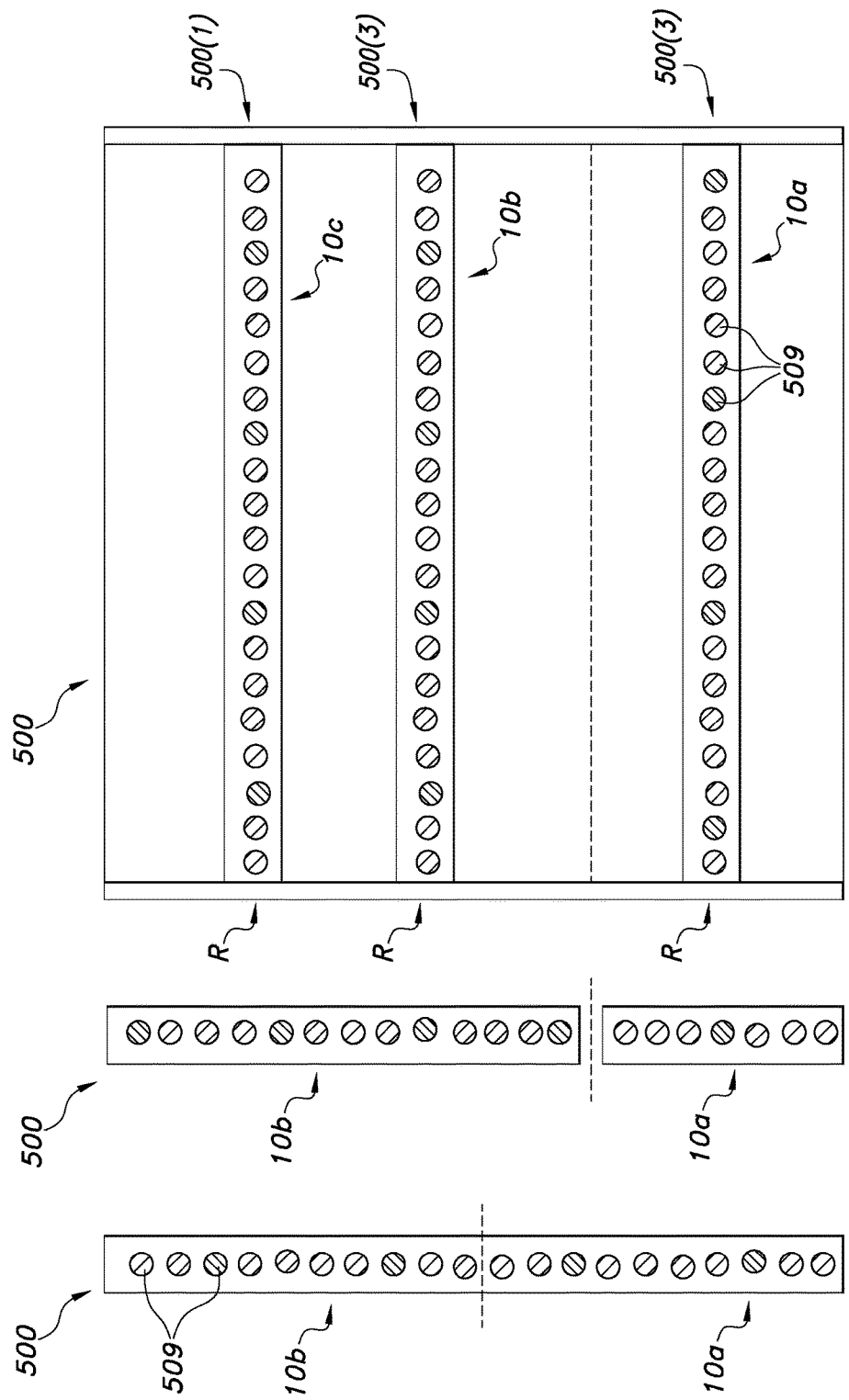

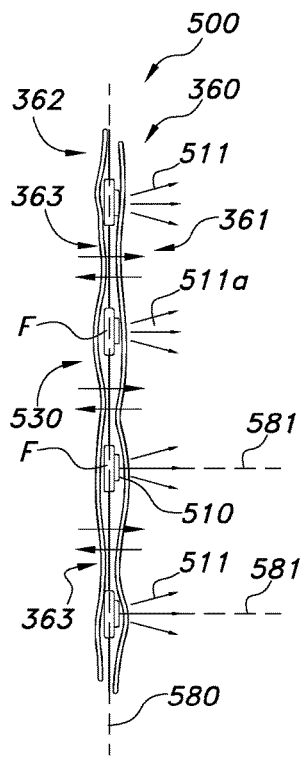
FIG. 2f
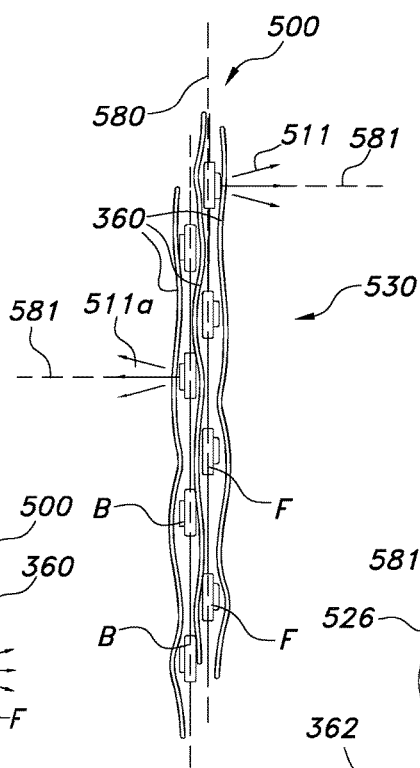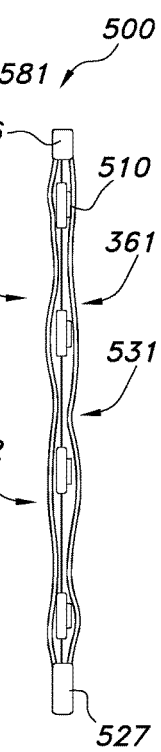
FIG. 2h
FIG. 2i
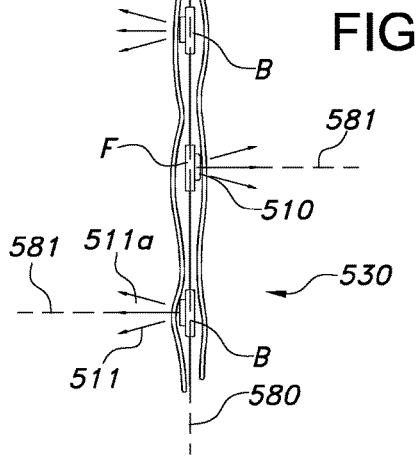
FIG. 2g

METHOD FOR ENHANCING THE NUTRITIONAL VALUE IN AN EDIBLE PLANT PART BY LIGHT, AND LIGHTING DEVICE THEREFORE

CROSS-REFERENCE TO PRIOR APPLICATIONS

This application is the U.S. National Phase application under 35 U.S.C. § 371 of International Application No. PCT/IB2013/058159, filed on Aug. 30, 2013, which claims the benefit of U.S. Provisional Patent Application No. 61/696,514, filed on Sep. 4, 2012. These applications are hereby incorporated by reference herein.

FIELD OF THE INVENTION

The invention relates to a method for enhancing the nutritional value in an edible plant part by light, as well as to lighting device therefore.

BACKGROUND OF THE INVENTION

Horticulture lighting is known in the art. US2010031562, for instance, describes a lighting installation for use in greenhouse farming for lighting crops in a greenhouse, comprising a number of light sources, such as lamps, provided above the crops to be lighted, and a number of dimmer devices for the light sources, characterized in that the dimmer devices are provided with control means for periodically, automatically varying the light intensity of the light sources cooperating with the dimmer devices according to a predetermined pattern. US2010031562 aims to provide a method and lighting installation, respectively, for greenhouse farming. In particular, the light sources are divided into a number of groups, the lighting installation being designed such that, in use, the power of each group varies according to a predetermined pattern, while patterns of different groups are phase-shifted relative to each other such that the electric power consumed by the joint groups varies less than the sum of the power variations of the separate groups, more particularly such that the electric power consumed by the joint groups varies less than the power variation of a single group, more particularly still such that the electric power consumed by the joint groups varies to a smallest possible extent, or does, at least virtually, not vary. In particular, all patterns are the same, but only phase-shifted relative to each other.

SUMMARY OF THE INVENTION

Plants use the process of photosynthesis to convert light, $CO_2$ and $H_2O$ into carbohydrates (sugars). These sugars are used to fuel metabolic processes. The excess of sugars is used for biomass formation. This biomass formation includes stem elongation, increase of leaf area, flowering, fruit formation, etc. The photoreceptor responsible for photosynthesis is chlorophyll. Apart from photosynthesis, also photoperiodism, phototropism and photomorphogenesis are representative processes related to interaction between radiation and plants:
  photoperiodism refers to the ability that plants have to sense and measure the periodicity of radiation (e.g. to induce flowering),
  phototropism refers to the growth movement of the plant towards and away from the radiation, and
  photomorphogenesis refers to the change in form in response to the quality and quantity of radiation.

Two important absorption peaks of chlorophyll a and b are located in the red and blue regions, especially from 625-675 nm and from 425-475 nm, respectively. Additionally, there are also other localized peaks at near-UV (300-400 nm) and in the far-red region (700-800 nm). The main photosynthetic activity seems to take place within the wavelength range 400-700 nm. Radiation within this range is called photo synthetically active radiation (PAR).

Other photo sensitive processes in plants include phytochromes. Phytochrome activity steers different responses such as leaf expansion, neighbor perception, shade avoidance, stem elongation, seed germination and flowering induction. The phytochrome photo system includes two forms of phytochromes, Pr and Pfr, which have their sensitivity peaks in the red at 660 nm and in the far-red at 730 nm, respectively.

In horticulture, the photosynthetic photon flux density (PPFD) is measured in number of photons per second per unit of area (in $\mu mol/sec/m^2$; a mol corresponding to $6 \cdot 10^{23}$ photons). In practice, when applying e.g. inter-lighting (see below), especially for tomatoes, the red PPFD used may be typically 200 $\mu mol/sec/m^2$. The ratio blue:red may be typically 1:7 (with red and blue ranging from 625-675 nm and from 400-475 nm respectively). Especially, the photosynthetic photon flux density may comprise about 10% blue and about 90% red. The PPFD can be determined from a photodiode or measured directly with a photomultiplier.

Plant growth depends not only on the amount of light but also on spectral composition, duration, and timing of the light on the plant. A combination of parameter values in terms of these aspects is called "light recipe" for growing the plant.

LEDs can play a variety of roles in horticultural lighting such as:
1. Supplemental lighting: Lighting that supplements the natural daylight is used in order to increase production (of tomatoes for example) or extend crop production during e.g. the autumn, winter, and spring period when crop prices may be higher.
2. Photoperiodic lighting: The daily duration of light is important for many plants. The ratio of the light and dark period in a 24 hour cycle influences the blossoming response of many plants. Manipulating this ratio by means of supplemental lighting enables regulating the time of blossoming.
3. Cultivation without daylight in plant factories.
4. Tissue culture.

For providing supplemental lighting during autumn, winter and spring in greenhouses (or all-year round in multi-layer growth), in general high-power gas-discharge lamps are used that have to be mounted at a relative high location above the plants to ensure sufficiently uniform light distribution across the plants. At present, in green houses different types of high power lamps ranging from 600 up to 1000 W (e.g. high power HID) are used to provide plants with supplemental light. One drawback is that from the location above the plants the amount of light reaching the lower parts of the plant is rather limited. At the same time the lower parts of the plant are often most in need of supplemental light. The same dilemma persists when using solid state lighting that is mounted above the plants. Nevertheless, LED lighting, especially solid state lighting, has some advantages over discharge based lighting.

Nutrients are chemical substances needed for maintaining or improving ones health. Nutrients are used to build and repair tissues, regulate body processes and are converted to and used as energy. Nutrients are produced by plants, mainly as a secondary metabolite. Metabolites are the products of metabolism. A primary metabolite is directly involved in normal plant growth and development. Secondary metabolites are chemicals produced by plants for which no role has yet been found in normal growth, photosynthesis, reproduction, or other primary functions. Examples of nutrients produced by plants are carbohydrates, proteins, vitamins, anti-oxidants and flavonoids (flavonoids are the most important plant pigments for flower coloration; their intake is helpful for example in decreasing coronary artery disease), etc.

Plants produce nutrients mainly in circumstances where light is abundant. They are produced from the excess pool of sugars; "cost-free" as they are constructed of sugars that the plant is unable to allocate for growth.

Under circumstances that the growth is limited by the amount of light available, which amounts to most circumstances (in horticulture applications), there is a negative correlation between plant or fruit growth and the generation of nutrients. In other words, in most circumstances substantially all the light is allocated for growth instead of generating nutrients.

Hence, it is an aspect of the invention to provide an alternative lighting method for horticulture application and/or to provide an alternative lighting device for horticulture application, which preferably further at least partly obviate one or more of above-described drawbacks, and which preferably further enhance/stimulate the production of nutrients.

It is e.g. suggested to locate the lamps in between the plants. Especially when using LEDs this is a possibility since LEDs can be distributed such as to provide a rather uniform illumination in between the plants without causing burning of the leaves of the plants in contact with the LEDs. This method of supplemental lighting is called inter-lighting (see also FIG. 1a). However, as described below, LED lighting may in a specific embodiment also be used to non-uniformly illuminate horticulture or crop parts; for instance to address different parts of the horticulture (such as fruits), different spectral distributions of the light may be desired.

To develop fruit weight, appearance, and physical strength, crops use various parts of the spectrum for various processes. In particular the photons in the blue and red region of the spectrum, with a wavelength between 440-470 nm and around 660 nm, respectively, are absorbed and used efficiently by the plant for photosynthesis, but also other developmental processes. Consequently, to maximize the yield per amount of emitted photons, the spectral composition of the light source should preferably be limited to the specific spectral regions leading to the best result. Therefore, due to the narrow spectral emission range, LEDs are very suitable and very efficient for horticultural applications.

Zooming into the specific needs of the various plants, it becomes obvious that various plants can benefit from a unique spectral light composition. To give an example, some plants in some growth stages may require an amount of about 5% blue light and about 95% red light, while other plants and/or other growth stages of the plants may need about 10% blue light and about 90% red light for best growth and development (see also above). Furthermore, some plants may develop more efficiently when extending the spectrum to the far red, i.e. beyond 675 nm, such as in the range 675-800 nm, like about 750 nm. Consequently, every type of crop may require a specific spectrum and thus a specific LED choice/combination, resulting in an enormous amount of different LED types and numbers. Hence, for horticultural lighting it means that one needs either a broad product range to cover the specific needs of the crop while at the same time being efficient in energy use, having low product cost, or one needs a product that is flexible and still affordable in terms of LED module production cost and plant growers' cost of ownership.

The inventors propose to grow the fruits or vegetables under optimum light conditions for growth and yield and use light for extra nutritional value only during the last days before harvesting. Also, in case of fruit-carrying plants, we aim this light for extra nutritional value mainly at the fruits. Hence, by providing radiation (light), especially with specific spectral light distribution, (in a specific period of time) nutrients are built up, and thereby the nutritional value in the edible plant part is enhanced (increased).

Therefore, in a first aspect the invention provides a method for enhancing the nutritional value in a first plant part of a crop, wherein the first plant part comprises an edible plant part (that may at least partly be above the ground), wherein the crop in addition to the first plant part comprises one or more other (above-ground) plant parts, wherein the method comprises preferentially illuminating during a specific period (herein also indicated as "nutritional enhancement lighting period" or simply "period") a target part of said first plant part with horticulture light that is selected to enhance formation of a nutrient in said first plant part while allowing one or more other (above-ground) plant parts to be subjected to different light conditions, wherein the nutritional enhancement lighting period is started within two weeks before harvest of the first plant part.

In this way, the edible plant part is preferentially illuminated with horticulture light that enhances built-up of nutritional value. Other parts of the plant may receive no light, or less light, or other light (see also below). As this is done a short time before harvesting, best results may be obtained.

The nutritional enhancing lighting period for applying the horticulture light (selected to enhance formation of a nutrient in said first plant part) may start within a two-week period before harvesting. This implies that this period may also be started one week before harvesting, etc. Hence, in an embodiment, the method comprises starting the nutritional enhancement lighting period one week before harvest of the first plant part.

The period may start at a fixed time, or may start at a time that is dependent upon e.g. the maturity of the first plant part. Hence, by human inspection and/or with (optical) sensors, the status of the crop and/or the first plant part(s) may be evaluated, and based thereon, the nutritional enhancement lighting period may be started (somewhere within two weeks from harvest). It may even be that, based on this evaluation, the harvesting time and/or date is set, and based thereon, the horticulture light is applied to the first plant part, however, not earlier than within the two weeks from the planned harvest. Hence, in an embodiment, the method comprises sensing the maturity of the first plant part and based thereon determining the start of the nutritional enhancement lighting period. This may be done with an optical sensor, though one or more other sensors may also be applied, like gas sensors (that evaluate metabolite presence and/or spectrum), and/or nutrition uptake sensors, etc.

Though the nutritional enhancement lighting period starts at a time not earlier than two weeks before harvest, the method does not necessarily involve a constant illumination of the first plant part with the horticulture light during the nutritional enhancement lighting period (or after start of the nutritional enhancement lighting period). For instance, a day-night scheme may be followed. Further, the illumination intensity or fluence may (thus) vary with time and may optionally be dependent upon evaluation of the crop and/or its first plant part(s), such as with one or more sensors. Based thereon, the fluence may be adapted to provide best results. Further, the illumination intensity may also be dependent upon ambient light intensity within the plant factory, which ambient light intensity may also be time dependent. Hence, in an embodiment the intensity of the horticulture light may be variable. In this way, the nutritional value may be well controlled, and optionally also more uniform (in the sense of nutritional value and/or size) first plant parts, such as fruits, may be obtained.

The invention thus allows different parts of a single crop to be subjected to different light conditions. Hence, a (edible) first plant part may receive during the nutritional enhancement lighting period e.g. light with a different spectral wavelength distribution and/or intensity than the (non-edible) other (above-ground) (non-edible) plant parts. At least the light that the first plant part receives may be (at least partially) controlled, whereas optionally, even more especially, the light that the other plant part receives may also be controlled. The other plant part may thus receive light (light conditions), but of another intensity and/or especially having another spectral wavelength distribution than the first plant part. Hence, the first plant part can be seen as being subjected during the nutritional enhancement lighting period light to be subjected to another light recipe than the (above-ground) rest of the crop. As will be clear to a person skilled in the art, in embodiments wherein e.g. roots are in a fully light absorbing medium, such as soil, these are not considered to be subjected to light conditions. The phrase "being subjected to light conditions" and similar phrases especially imply that the part being subjected to light conditions receives is, such as in general at least all above-ground parts may receive light.

In a further aspect, the invention also provides a lighting device (or luminaire) that may e.g. be applied in this method. Hence, in a further aspect, the invention provides a lighting device comprising a plurality of light sources, especially arranged in 2D array of light sources, wherein the 2D array of light sources comprises a first subset of light sources and a second subset of light sources, wherein the first subset and the second subset are individually controllable, wherein in specific embodiments the lighting device is further configured to provide during a nutritional enhancement lighting period horticulture light having a spectral light distribution with at least light intensity at a first wavelength selected from the range of 300-475 nm and at a second wavelength selected from the range of 600-800 nm, wherein during said nutritional enhancement lighting period the first subset of light sources provides horticulture light having a higher intensity in one or more of said wavelength ranges, than the second subset of light sources. These two or more subsets may be individually controllable with respect to one or more of lighting time, light intensity and spectral light distribution. In another embodiment, the lighting device is as defined above, but the plurality of light sources are arranged in a 1D array.

This lighting device may provide the desired light at the indicated period to the target part of the (edible) plant part. The device is further elucidated below.

The term "horticulture" relates to (intensive) plant cultivation for human use and is very diverse in its activities, incorporating plants for food (fruits, vegetables, mushrooms, culinary herbs) and non-food crops (flowers, trees and shrubs, turf-grass, hops, grapes, medicinal herbs). The term "crop" is used herein to indicate the horticulture plant that is grown or was grown. Plants of the same kind grown on a large scale for food, clothing, etc., may be called crops. A crop is a non-animal species or variety that is grown to be harvested as e.g. food, livestock fodder, fuel, or for any other economic purpose. The term "crop" may also relate to a plurality of crops. Horticulture crops may especially refer to food crops (tomatoes, peppers, cucumbers and lettuce), as well as to plants (potentially) bearing such crops, such as a tomato plant, a pepper plant, a cucumber plant, etc. Horticulture may herein in general relate to e.g. crop and non-crop plants. Examples of crop plants are Rice, Wheat, Barley, Oats, Chickpea, Pea, Cowpea, Lentil, Green gram, Black gram, Soybean, Common bean, Moth bean, Linseed, Sesame, Khesari, Sunhemp, Chillies, Brinjal, Tomato, Cucumber, Okra, Peanut, Potato, Corn, Pearlmillet, Rye, Alfalfa, Radish, Cabbage, Lettuce, Pepper, Sunflower, Sugarbeet, Castor, Red clover, White clover, Safflower, Spinach, Onion, Garlic, Turnip, Squash, Muskmelon, Watermelon, Cucumber, Pumpkin, Kenaf, Oilpalm, Carrot, Coconut, Papaya, Sugarcane, Coffee, Cocoa, Tea, Apple, Pears, Peaches, Cherries, Grapes, Almond, Strawberries, Pineapple, Banana, Cashew, Irish, Cassava, Taro, Rubber, Sorghum, Cotton, Triticale, Pigeonpea, and Tobacco. Especial of interest are tomato, cucumber, pepper, lettuce, water melon, papaya, apple, pear, peach, cherry, grape, and strawberry.

The first plant part especially is an edible plant part. Hence, it is a part of a plant ("crop") that is known in one or more human cultures as edible. The invention is thus not directed to those types of crops that are (substantially) entirely edible, like lettuce, but is directed to those types of crops that have a clearly distinguishable part that is considered to be edible and one or more other parts that are considered not to be (essentially) edible. One may for instance refer to a fruit crop, with the fruit that is edible, and the leaves and stem that is (are) not edible.

The first part, or the edible part, is especially at least partly above the ground. Hence, the invention may also be applied to crops that are known to have sometimes, often, or always edible parts that are at least partly above the ground but at least also partly within the ground. One may consider e.g. onions, which have often a part above the ground; the non-edible parts are amongst others the leaves above the ground. Hence, the invention is especially applied to those crops that comprise (a) an edible part, such as a fruit, especially at least partially above the ground, as well as (b) one or more (other) (above-ground) plant parts that are substantially less edible than the first part (or not at all edible). Of course, the crop may comprise a plurality of such parts. Hence, the term "first part" or "edible" part, and similar terms, may also refer to a plurality of such parts (comprised by one crop). Further, the term "crop" may also refer to a plurality of crops. The other plant part is especially an above-ground plant part (herein also indicated as "other above-ground plant part".

Note that the term "first plant part" may also refer to a plurality of first plant parts. Optionally, these may be different types of plant parts, for instance crops that comprise different types of edible parts (in combination with other parts of the plant (above the ground) not considered being edible).

The term "ground" especially relates to "soil" or "potting soil", in which the crop will have most of its root mass. However, ground may in principle also refer to other media on and/or in which a crop may root and grow, like hydro culture, wherein plants are grown in a soilless medium (and nutrients for the crop may be distributed via water). In general, there will be a plant part that (after growth) is above the medium, and a plant part, especially the root(s), that is (substantially) below the medium.

As indicated above, especially the invention is applied to crops that comprise edible parts which are preferably at least partly above the ground. Hence, especially the first plant part is a fruit or vegetable selected from the group consisting of a flower bud, a seed, a tuber, a whole plant sprout, a root, a bulb, a legume, a botanical fruit that is used as a culinary vegetable, and a culinary fruit. The term "fruit" especially relates to its culinary meaning, which can e.g. be described as any edible part of a plant with a sweet flavor. The term "vegetable" may also especially relate to its culinary meaning, which can e.g. be described as any edible part of a plant with a savory flavor.

Examples of flower buds are e.g. broccoli, cauliflower, globe artichokes, capers, etc.; examples of seeds are e.g. sweet corn (maize), peas, beans, etc.; examples of tubers are e.g. potatoes, Jerusalem artichokes, sweet potatoes, taro, and yams (it is noted that regularly potatoes are partly above the ground), etc.; examples of whole-plant sprouts are e.g. soybean (moyashi), mung beans, urad, and alfalfa, etc.; examples of some roots that may be partly above the ground are beets, radishes, rutabagas, turnips, etc.; examples of bulbs are onions, etc.; examples of fruits in the botanical sense, but used as vegetables are tomatoes, cucumbers, squash, zucchinis, pumpkins, peppers, eggplant, tomatillos, christophene, okra, breadfruit, avocado, etc.; examples of legumes are green beans, lentils, snow peas, soybean, etc.; and examples of culinary fruit are Muskmelon, Watermelon, Cucumber, Pumpkin, Kenaf, Oilpalm, Carrot, Coconut, Papaya, Apple, Hedge apple, Pear, Peach, Cherries, Grape, Grape fruit, Strawberry, Pine apple, Banana, Pomegranate, Kiwifruit, Cranberry, Blueberry, Gourd, Melon Orange, Lemon, Lime, Blackberry, Raspberry, Boysenberry, Fig, Mulberry, Rose hip, etc. etc. Also nuts may belong thereto, though some of them may be found in different classes. Nuts that may be relevant are e.g. almond, pecan, walnut, cashew nut, Chilean hazelnut or Gevuina, macadamia, (Malabar) chestnut, peanut (can also be considered a legume), pistachio nut, etc.

Good results may be obtained when the first plant part is illuminated with UV/blue and/or (infra)red light, especially with all these types of light. Hence, in an embodiment, the horticulture light has a spectral light distribution with at least light intensity at a wavelength selected from one or more of the ranges of 300-475 nm and 600-800 nm. Hence, in an embodiment, the horticulture light has a spectral light distribution with at least light intensity at a first wavelength selected from the range of 300-475 nm and at a second wavelength selected from the range of 600-800 nm.

Even more especially, the horticulture light has a spectral light distribution with at least light intensity at a wavelength in the ranges of (both) 300-475 nm (especially at least in the range of 400-475 nm) and 600-800 nm. Yet even more especially, the horticulture light has a spectral light distribution with at least light intensity at a wavelength in the ranges of 300-400 nm, 400-475 nm and 600-800 nm. Especially, the horticulture light has a spectral light distribution substantially in the indicated range(s). With respect to the (infra)red horticulture light, the horticulture light for enhancement of nutrition generation has especially a spectral light distribution with at least light intensity at a wavelength in the range of 600-800, even more especially 600-730 nm, such as 600-700 nm, especially 625-700 nm, such as even more especially 625-675 nm.

For good results, the method may especially comprise providing said horticulture light to said target part with a photosynthetic photon flux density (PPFD) measured in number of photons per second per unit of area (in μmol/sec/m$^2$) of at least 50 μmol/sec/m$^2$, especially at least 70 μmol/sec/m$^2$, even more especially at least 100 μmol/sec/m$^2$. This typically specified as light installed per m$^2$ of the horticulture production area, such as a greenhouse ground surface. In more general terms, the area in the definition of the PPFD is the irradiated area of the horticulture production site. Another term for the horticulture production site is a horticulture production facility, such as a greenhouse or a multi-layer plant factory. Hence, for the PPFD the number of photons horticulture light per second divided by the irradiated area may be applied. In case of multi-layer growth, see also below, the area of each layer (or shelf) is taken into account. In case of inter-lighting, see also below, the (vertical) surface area of the LED grid may be taken into account.

It further appears that the ration red/blue may be chosen to provide best nutrition generation conditions. In an embodiment, the ratio of the photosynthetic photon flux densities (PPFD) of blue:red of the horticulture light illuminating said target part of said first plant part is in the range of 1:2-1:50, with red and blue ranging from 600-800 nm and from 400-475 nm, respectively. Especially the ratio of the photosynthetic photon flux densities (PPFD) of blue:red of the horticulture light illuminating said target part of said first plant part is in the range of 1:5-1:20, with red and blue ranging from 625-675 nm and from 400-475 nm, respectively.

The horticulture light for nutrition enhancement may thus especially include red light, and (optionally) some blue light. In an embodiment, the horticulture light has a spectral light distribution with at least light intensity at a wavelength selected from the range 625-730 nm, even more especially 625-675 nm, and the photosynthetic photon flux density (PPFD) (within said wavelength range) measured in number of photons per second per unit of area (in μmol/sec/m$^2$), to which the target part is exposed, is in the range of 100-400 μmol/sec/m$^2$. In yet a further embodiment, preferably combined with the former, the horticulture light has a spectral light distribution with at least light intensity at a wavelength selected from the range 400-470 nm, and the photosynthetic photon flux density (PPFD)(within this wavelength range) measured in number of photons per second per unit of area (in μmol/sec/m$^2$), to which the target part is exposed, is in the range of 2-100 μmol/sec/m$^2$. In yet a further embodiment, preferably combined with the former embodiments, the horticulture light has a spectral light distribution with at least light intensity at a wavelength selected from the range 300-400 nm, and the photosynthetic photon flux density (PPFD)(within this wavelength range) measured in number of photons per second per unit of area (in μmol/sec/m$^2$), to which the target part is exposed, is in the range of 1-50 μmol/sec/m$^2$.

The method of the invention includes providing light to the target part, such that the target part gets more light of a specific kind than it would receive otherwise. It may be that the horticulture light to the target part is the only light to which the crop is exposed. However, it may also be that the crop is anyhow exposed to light, or at least part of the crop is anyhow exposed to light. Hence, the horticulture light may be supplemental light in addition to existing lighting by one or more of daylight and artificial light.

Horticulture crops may especially be grown in a greenhouse. Hence, the invention especially relates to the application of the device and/or the method in a greenhouse. The device may be arranged between plants, or between plants to be, which is referred to as "inter-lighting". Horticulture growth on wires, like tomato plants, may be a specific field of application for inter-lighting, which application may be addressed with the present device and method. The device may also be arranged on top of plants or plants to be. Especially when horticulture crops are grown in layers on top of each other, artificial lighting is necessary. Growing horticulture crops in layers is indicated as "multi-layer growth" and may take place in a plant factory. Also in multi-layer growth, the device and/or method may be applied.

Therefore, in a further aspect, the invention provides also a horticulture application, which may also be referred to as a horticulture site or plant factory, especially selected from the group comprising a greenhouse (plant factory) and a multi-layer plant factory, wherein the horticulture application further comprises the lighting device, such as described herein. In an embodiment, such horticulture application comprises a plurality of said lighting devices, wherein said lighting devices are optionally configured to illuminate crops (sideways) within said horticulture application. In another embodiment, the horticulture application comprises multiple layers for multi-layer crop growth, the horticulture application further comprising a plurality of said lighting devices, configured for lighting the crops in said plurality of layers. In embodiments where inter-lighting is used, the lighting devices, such as a LED grid will in general be arranged vertical, whereas in embodiment with multi-layer crop growth, the lighting devices, such as a LED grid, will in general be arranged horizontal, although (smaller size) inter-lighting may also be applied in multi-layer crop growth.

Especially in greenhouses wherein horticulture crops are grown in rows (which can be indicated as horticulture arrangement), the method of the invention may be applied to realize a sideways or substantially horizontal illumination of the crop, which may also be referred to as side lighting. The phrase "sideways illumination of the crop" especially indicates a configuration of the lighting device such that during at least part of the growth process of the crop, the crop is illuminated from a side. This does not exclude (additional) top lighting, but at least the lighting device of the method of the invention is configured in such a way that the crop is lit from a side of the crop during at least part of the growth process of the crop. Assuming a growth of crops in rows, at least part of the lighting device, especially at least part of its light emitting surface, may be arranged in between the rows of crops. Hence, at least part of the horticulture light of the lighting device used in a method according to an embodiment of the invention may have a horizontal propagation component and illuminate one or more crops. With known top lighting arrangements in current greenhouses this is not possible. An advantage of side lighting is that the crops may be better (more integral and uniform) illuminated, energy use is more efficient and thus total energy consumption may be reduced, and especially with the device of the invention, it may be possible to selectively drive a part of the device to illuminate the whole or part of a crop (e.g. dependent upon the height of the crop and/or the part of the crop to be illuminated) and/or select a specific color to meet the demand of the crop in a specific growth stadium.

Therefore, in an embodiment, the invention also provides an embodiment wherein the method is applied in a horticulture application comprising a plurality of crops with first plant parts, wherein the method comprises illuminating the plant parts with the horticulture light of a lighting device which is at least partly arranged between the plurality of crops. This is also called "inter-lighting".

Especially, a lighting device may be applied which comprises a plurality of light sources, especially arranged in 2D array comprising rows of light sources, wherein one or more (rows of) light sources are configured to provide during said nutritional enhancement lighting period horticulture light that has higher light intensity at a first wavelength selected from the range of 300-475 nm and at a second wavelength selected from the range of 600-800 nm than one or more other (rows of) light sources during said nutritional enhancement lighting period. In this way, e.g. lower (rows of) light source(s) may provide the nutrition enhancement lighting during the nutritional enhancement lighting period, whereas higher (rows of) light source(s) may provide other type of lighting, such as growth light which may be beneficial for plant growth and development. Hence, this lighting device may especially be applied as inter-lighting device, i.e. a device that may in embodiments provide light to both sides of the device and may (thus) (at least partly) be arranged between the crops. Therefore, in a specific embodiment, the lighting device is configured to provide during said nutritional enhancement lighting period horticulture light having a spectral light distribution with at least (especially substantial) light intensity at (both) a first wavelength selected from the range of 300-475 nm and at a second wavelength selected from the range of 600-800 nm, wherein during said nutritional enhancement lighting period one or more lower rows provide horticulture light having a higher intensity in one or more of said wavelength ranges, than one or more higher rows. As indicated above, the one or more higher rows provide during said nutritional enhancement lighting period horticulture light having a spectral light distribution with at least light intensity at a first wavelength selected from the range of 600-800 nm. Typically, but not always, the first plant parts are found at the lower part of the crop and hence, the term lower is relative to the position of the fruits on the crop.

As indicated above, in some instances, alternatively or additionally top lighting may also be desired. Top lighting may especially be relevant in the case of multi-layer applications. Hence, in another embodiment, the method is applied in a horticulture application comprising a plurality of crops with first plant parts, arranged in multi-layers, wherein the method comprises top illuminating the plant parts with the horticulture light of a lighting device which is at least partly arranged over the plurality of crops in a layer. Again, the lighting device may comprise a plurality of light sources, wherein one or more light sources are configured to provide during said nutritional enhancement lighting period horticulture light that has higher light intensity at a first wavelength selected from the range of 300-475 nm and/or at a second wavelength selected from the range of 600-800 nm than one or more other light sources during said nutritional enhancement lighting period.

The light sources that are configured to provide light during the nutritional enhancement lighting period to the target part, and the other light sources, may in an embodiment be individually controllable. In a further embodiment, the lighting device comprises a plurality of light sources, with a least a first subset and a second subset, wherein the former may be used for the nutrition enhancement light during the nutritional enhancement lighting period, and the latter may be applied for lighting other part(s) of the crop. These subsets may be individually controllable (in terms of one or more of color, intensity, and time).

Note that the first subset may comprise one or more light sources of which the light distribution of the light may be varied. In yet another embodiment, which may be combined with the former, the first subset and/or the second subset may (each) comprise a plurality of light sources which provide different types of light. By controlling the light intensity of the light sources in the subset(s) the spectral distribution of the light of the subset(s) is controllable.

In a specific embodiment, the lighting devices may be based on an open grid or mesh of LEDs with connecting wires, wherein the grid or mesh of LEDs defines a grid plane, and wherein especially the LEDs are configured to provide horticulture light in beams of light having optical axes perpendicular to the grid plane (see further also below). The orientation of the LEDs may, in an embodiment, alternate between sending light from a front (F), or first side, and from a back (B), or second side, of the grid plane. Hence, subsets (or LED arrangements) of the total number of LEDs may be configured anti-parallel with respect to each other (see further also below). Note that front an back can—dependent upon the configuration—be interchanged.

Further, in an embodiment, the LEDs may be grouped such that the driving voltage may be kept constant irrespective the size of the LED grid. Especially, in an embodiment, the LEDs in the grid may emit different colours of light. All LEDs emitting a certain colour may be arranged in a sub-grid (subset) and sub-grids may be interweaved to maximize illumination uniformity. In an embodiment, the LEDs and current wires are covered with a transparent plastic or foil e.g. sandwiched between two sheets of plastic with holes at appropriate locations corresponding with openings in the grid.

Next to the fact that the luminaire may be configured to be located in between the (future) crops, the lighting device may also be applied as a top lighting device for multi-layer growth. This LED configuration may thus be applied in inter-lighting but also in other types of lighting, such as top lighting, including multi-layer lighting (see below). Hence, the invention is not limited to inter-lighting applications. When applying top lighting, the lighting device will in general be configured to provide light to one side of the lighting device. Hence, in embodiments, the light sources, especially LEDs, are configured to provide light in one direction, e.g. light emanating from one side of a lighting device, such as a grid-based lighting device. This may for instance be of interest for top lighting. In other embodiments, the light sources, especially LEDs, are configured to provide light in two substantially opposite directions, e.g. light emanating from two sides of a lighting device, such as a grid-based lighting device. This may for instance be of interest for inter-lighting.

Hence, in an aspect, the invention provides a method for providing (supplemental) horticulture light to a crop comprising illuminating the crop with the horticulture light of a lighting device, the lighting device comprising an array comprising a plurality of light sources, especially a plurality of LEDs, such as a 1D array or a 2D array, in some embodiments especially a grid comprising a plurality of light sources, especially a plurality of light emitting diodes (LEDs) and through holes; the LEDs are configured to provide (during use) said (supplemental) horticulture light. In an embodiment, the method provides sideways illumination of the crop.

Especially, the grid comprises a grid plane, and the LEDs are configured to provide (during use) said horticulture light in beams of light having optical axes, and the LEDs are configured to provide (during use) said horticulture light in said beams of light having said optical axes configured perpendicular to said grid plane.

In yet a further aspect, the invention provides a lighting device ("device"), which can be used in such method, comprising a grid comprising a plurality of light emitting diodes (LEDs) and comprising through holes, wherein the LEDs are especially configured to provide (during use) said (supplemental) horticulture light in beams of light having optical axes, and wherein the LEDs are configured to provide (during use) said horticulture light in said beams of light having optical axes configured perpendicular to said grid plane. In an embodiment, the lighting device is arranged to illuminate the crops sideways.

An advantage of this (optionally color tunable) device and this (optionally color tunable) illumination method is that different types of horticulture crops, but also horticulture crops in different stages, and even different parts of the crops can be illuminated with light that fits best with the light demand of the type of crop, its stage and/or the respective crop part, in a relatively easy way. Further, due to the presence of the through holes, transport of gas and/or pollination will not be hampered. The presence of the through holes may be beneficial in controlling and maintaining the climate (carbon dioxide control, humidity control, etc.) in a horticulture environment such as a greenhouse, as the horticulture lighting device is less obstructive for these control processes. The presence of the through holes also improves the availability of ambient and/or outdoor light at the horticulture plants.

The term "grid" may especially relate to a network. In a LED grid, the LEDs are arranged within this network or on the network, or part of the total number of LEDs are arranged in the network or on the network. Hence, the term "grid" may also relate to a circuit or LED circuit. The grid especially includes a 2D arrangement, array or matrix of LEDs. Hence, the grid may also be indicated as 2D grid or matrix. In a specific embodiment, the grid comprises, or is, a wire mesh. The "grid" is herein also indicated as "LED grid".

The term "grid" may also indicate a system that has a length and height that are substantially larger than the width, such as over 10 times larger. As indicated below, the grid may have an area (i.e. the area covered by the grid or grid surface area) of $0.5 \ m^2$ or much larger, whereas the thickness may only be a few mm, or up to a few cm. The grid may be flexible (see also below). The grid has a first side (front) and a second side (back), which are arranged opposite of each other, and from one or both sides horticulture light may emanate (during use of the lighting device). The surface areas of the front and back sides and the coverage area of the grid (in the plane of the grid) are in general the same. The grid also defines a (virtual) grid plane, which will in general thus be parallel to the first side and second side, which are herein also indicated as front (side) and back (side). The grid may therefore also be referred to as a "planar grid", not limited to flat or rigid. The through holes are from the first side to the second side.

Especially, the LEDs may be configured to provide said horticulture light in beams of light having optical axes, wherein preferably said optical axes are configured perpendicular to said grid plane. Especially, this may apply to at least 75% of the total number of LEDs of the device, such as at least 90% of the plurality of LEDs.

Hence, the LEDs may be configured to provide (during use) said horticulture light in beams of light having optical axes perpendicular to said grid plane. Hence, a vertically arranged grid may provide beams of light propagating horizontally.

The term "perpendicular" may also relate to "substantially perpendicular". Perpendicular may therefore relate to e.g. 90°±10%, such as especially 90°±5%, such as 90°±1%. Likewise, the term "horizontal" may refer to "substantially horizontal", with slight deviations, like within 10°, especially within 5°, such as within 1°, from the earth's surface.

As indicated above, in an embodiment part of the total number of LEDs may provide light emanating from the back of the grid and part of the total number of LEDs may provide light emanating from the front of the grid. Hence, especially the plurality of light emitting diodes may comprise two or more subsets of LEDs, wherein the LED(s) of one or more of said subsets are configured to provide beams of light in an opposite direction to the LED(s) of one or more other subsets. These two or more subsets may be independently controllable.

Hence, the device may also comprise a plurality of subsets to provide light from a first side of the device, the subsets configured to provide light with different spectral light distributions, and a plurality of subsets to provide light from a second side of the device, the subsets configured to provide light with different spectral light distributions, wherein all these (back and front) subsets are independently controllable. A further parameter may be the position of the LED(s) or subset(s) of LED(s), by which the spatial distribution of the spectral light may be controlled; see further below.

The lighting device, especially the grid, may span an area of for instance 0.5-400 m², such as 2-400 m². The number of LEDs per m² (LED density) may for instance be in the order of 1-400, such as 4-100, though there may be grids with more or even with less LEDs (per square meter). Note that the distribution of the LEDs over the grid may be regular or may vary in different areas in the grid. In general, the LEDs will be arranged in a regular pattern, though other patterns may not be excluded. The device may comprise for instance at least 16 LEDs. In an embodiment, the device comprises n×m LEDs, wherein n is at least 4, and m is at least 4, such as at least 10.

The LEDs are especially solid state LEDs, but may optionally also be organic LEDs. Also combinations of solid state and organic LEDs may be applied. The term "LED" may also relate to a plurality of LED dies. Hence, in an embodiment, at a single LED position, a plurality of LED dies may be arranged, such as a LED package of 2 or more LED dies. The term "LED" may also relate to a LED package.

The advent of solid state lighting based on LEDs offers opportunities for application in horticulture. The main advantages of using LEDs result from the possibility to control the spectral composition of the light to closely match the plant's photoreceptors' sensitivity. Together with additional benefits like improved heat control and freedom of distributing the LEDs, this provides a more optimal production and enables influencing the plant's morphology and composition. It also promises a reduced energy consumption (and associated cost).

Solid state LEDs are easily integrated into digital control systems, facilitating lighting programs such as "daily light integral" lighting and sunrise and sunset simulations. LEDs are safer to operate than current lamps because they do not have glass envelopes and do not contain mercury.

LEDs enable one to distribute the light closer to the target which can result in less loss through the roof and into the floor of the greenhouse. Moreover a better light distribution in the crop can be accomplished. This is certainly the case for high-wire crops like tomatoes.

As indicated above, one or more LEDs may comprise converter material(s), such as one or more of an inorganic dye and an organic dye, for at least partially converting the LED light into light having another wavelength.

The lighting device may be a flexible lighting device. For instance, it may be a flexible (2D) wire grid or a flexible mesh. The lighting device may suspend from a roof or ceiling, or may be provided in a frame (such as between rails that may also be used as or include electrical conductors), etc.

In an embodiment, the plurality of light emitting diodes comprise two or more independently controllable subsets of light emitting diodes, wherein optionally two or more of said subsets are arranged at different heights, and wherein the method further includes providing horticulture light by one or more of said subsets as a function of the height of the crop or the (height) area of the crop to be illuminated. The two or more subsets are independently controllable, such as by a control unit. In this way, the on-off status, and optionally the intensity and/or optionally the color, of the two or more subsets may individually be controlled. The LEDs may be arranged in and/or on a (conductive) wire grid.

In an embodiment, the first subset comprises a plurality of light emitting diodes. In another embodiment, the second subset comprises a plurality of light emitting diodes. In yet another embodiment, the first subset comprises a plurality of light emitting diodes and the second subset comprises a plurality of light emitting diodes.

The invention also relates in some embodiments to a method and/or device wherein the plurality of light emitting diodes comprises two or more independently controllable subsets of light emitting diodes, wherein at least two of said subsets are configured to generate light having different spectral distributions.

As in an embodiment, different subsets of the plurality of LEDs may provide different types of light such that the spectral distribution may be tuned to the needs of the horticulture processes. In an embodiment, the spectral distribution may be changed over time and in another embodiment, the spectral distribution may be changed spatially e.g. in the height direction of the device. In this way, e.g. fruit parts may receive another type of light than leave parts. In an embodiment, one or more of said subsets are configured to provide light having a first wavelength selected from the range of 400-475 nm, and one or more of said subsets are configured to provide light having a second wavelength selected from the range of 600-800 nm. In a specific embodiment, the first subset is configured to generate first light having a first spectral distribution with at least light intensity at said first wavelength range (of 400-475 nm). The second subset may in an embodiment be configured to generate second light, having a second spectral distribution with at least light intensity at a red wavelength selected from the range of 625-675 nm and/or at a far red wavelength, larger than the red wavelength, selected from the range of 675-760 nm. Especially both wavelength ranges (625-675 nm and 675-760 nm) may be represented and may be part of the horticulture light (especially the second light).

Especially, a first subset of the plurality of light emitting diodes is configured to emit (during use) light having a spectral light distribution substantially in the range of 400-475 nm, and a second subset of the plurality of light emitting diodes is configured to emit (during use) light having a spectral light distribution substantially in the range of 600-800 nm.

As indicated above, the lighting device may comprise two or more subsets of LEDs. The first subset and the second subset may have LEDs arranged in an elongated shape with subsets arranged parallel. For instance, two or more subsets of LEDs may be provided as elongated subsets, like in the form of rows of LEDs. In this way, a lighting device may be provided wherein strips may provide light with different spectral distributions. These two or more subsets may be independently controllable.

The lighting device may comprise a plurality of first subsets and a single second subset. In yet another embodiment, the lighting device comprises a single first subset and a plurality of second subsets. In yet another embodiment, the lighting device comprises a plurality of first subsets and a plurality of second subsets.

As indicated above, the lighting device may comprise through holes. Assuming a horticulture arrangement with rows of growing crops, with lighting devices arranged in between the rows, then air may flow around the crops and between the rows, without substantial hindrance, or at least without being entirely blocked over the whole area of the lighting device. The through holes allow air flow, but may also reduce shade areas. In a specific embodiment, the grid has a coverage or surface area, wherein the through holes have cross-sectional areas, wherein the total area of the cross-sectional areas of the through holes is in the range of 30-95% of the grid coverage area, which may especially provide above mentioned beneficial effects.

The plurality of LEDs may be embedded in a transparent foil. Especially, the transparent foil comprises through holes from a first side of the foil to a second side. These through holes may substantially coincide with the above-mentioned through holes of the grid, or may even be these through holes. Especially, the foil has a foil area, and wherein the through holes have cross-sectional areas, wherein the total area of the cross-sectional areas of the through holes is in the range of 30-95% of the foil area. Again, this may be beneficial for climate control, as e.g. air flow may be hindered substantially less than with a closed lighting device.

The term "substantially" herein, such as in "substantially all emission" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 2a-2i schematically depict some embodiments;

DETAILED DESCRIPTION OF THE EMBODIMENTS

Figure 1A:
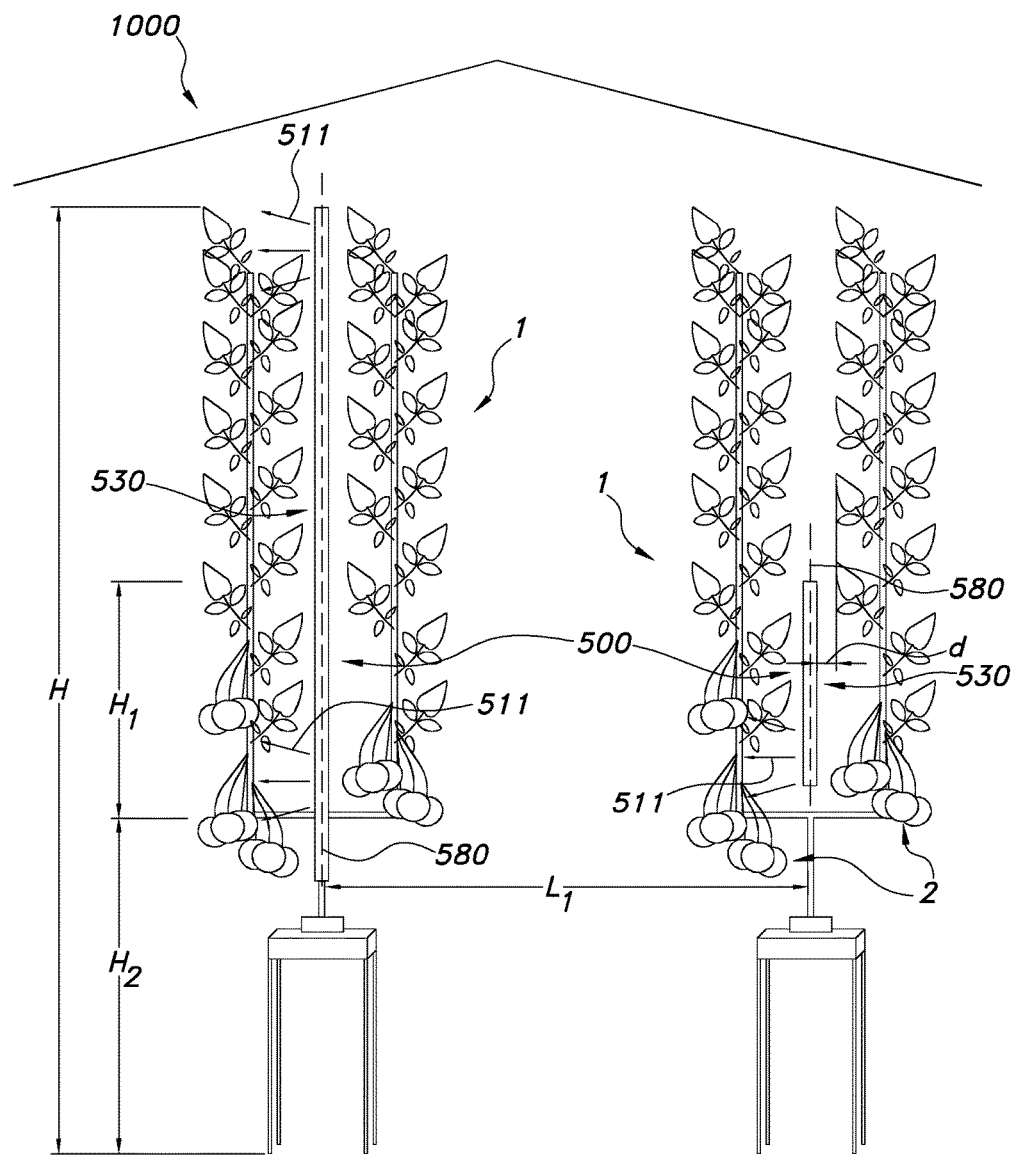
FIGS. 1a-1d schematically depict some applications and aspect.

FIG. 1a schematically depicts a horticulture application for high wire crops e.g. tomato growth. The horticulture crop is indicated with reference 1. By way of example, the possible fruit(s) or edible plant part(s) are tomatoes in the depicted case. The tomato crop is only used as example to illustrate some aspects. The fruit(s) are an example of edible fist plant parts, which are further indicated as first plant part(s) 2. The crops or tomato plants are arranged in rows. The interdistance between the rows, and hence between the plants, is indicated with reference L1, and can for instance be in the range of 1-2 m, such as 1.5 m. The total height from ground level, indicated with reference H may e.g. be in the range of 2-4 m, such as about 3 m. The part of this total height which is especially relevant for horticulture lighting improving the nutritional value of the fruit(s) may cover a height H1, and is in the range of 0.5-1 m, and is about a height H2 above ground level, which height H2 may be in the range of 0.5-1.5 m, especially about 1 m. At least part of the H2 part may be illuminated as well but from the top (daylight and/or artificial). The lighting device(s), indicated with reference 500, may especially address the horticulture crop over said height H1; however, on the left side a relative high lighting device 500 is shown, just by way of example. Reference d indicates the distance between the (light emitting surface(s) of the) lighting device 500 and the crop 1. Reference 511 indicates the horticulture light that may be generated by the lighting device 500. As indicated above, over the height and/or the length of the lighting device 500, the horticulture light 511 may differ in intensity and spectral distribution.

Reference 1000 indicates a horticulture application or plant factory, here by way of example a greenhouse. A plurality of rows of crops 1 may be arranged in the horticulture application.

The device 500 may comprise a plurality of light sources, such as light emitting diodes (see further also below). This plurality of light emitting diodes may comprise in an embodiment two or more independently controllable subsets of light emitting diodes (see below). Two or more of said subsets can be arranged at different heights. In this way, horticulture light 511 may be provided to the crop(s) 1 by one or more of said subsets as function of e.g. the height of the crop 1.

The lighting device may comprise a grid or 2D arrangement of LEDs, which is further elucidated below. The grid is indicated with reference 530. The lighting device 500 may e.g. be rectangular or square, see also below, such as a grid. The lighting device has a plane, which is further indicated as a (grid) plane 580, which is in this drawing perpendicular to the plane of drawing. The first side and the second side of the lighting device 500, here especially the grid 530, are parallel with the grid plane 580, as illustrated in the FIGS. 2f-2i. Note that the first and/or the second side are not necessarily flat, as the grid may for instance comprise a wire mesh with LEDs arranged thereon. As can be seen from FIGS. 2f-2i, the horticulture light 511 may emanate from the first and/or the second side of the lighting device, here especially the grid 530.

Another embodiment will be discussed next with reference to FIG. 1b. In this embodiment, the lighting device 500 as described herein, is used for multi-layer growth. The multiple layers are indicated with references 1010. In this case it is beneficial that all LEDs emit in the same direction towards the plants. In this case, it may be advantageous to sandwich the LED grid in between two foils. This enables an LED grid that is mechanically more robust and better shielded from the humid environment present in plant factories. Preferably, the foil at the back of the LEDs is made diffuse reflecting by incorporating a layer that contains a white paint based on particles such as $TiO_2$. The advantage is that light that is reflected by the plant back to the light source is recycled. The foil is indicated with reference 360. The foil 360 may in an embodiment comprise trough holes (see also below). The LEDs of the device, which are depicted in more detail in further figures, emit beams of light, which beams are indicated with reference 511a. These beams have optical axes 581. As can be seen in the figure, the optical axes are perpendicular to the grid plane.

Here, the lighting device is especially described with the embodiment of the grid 530; however, also other embodiments are possible (see also below). Further, the lighting device 500 comprises light sources 509, which may especially be LEDs, which are indicated with references 510.

Figure 1B:
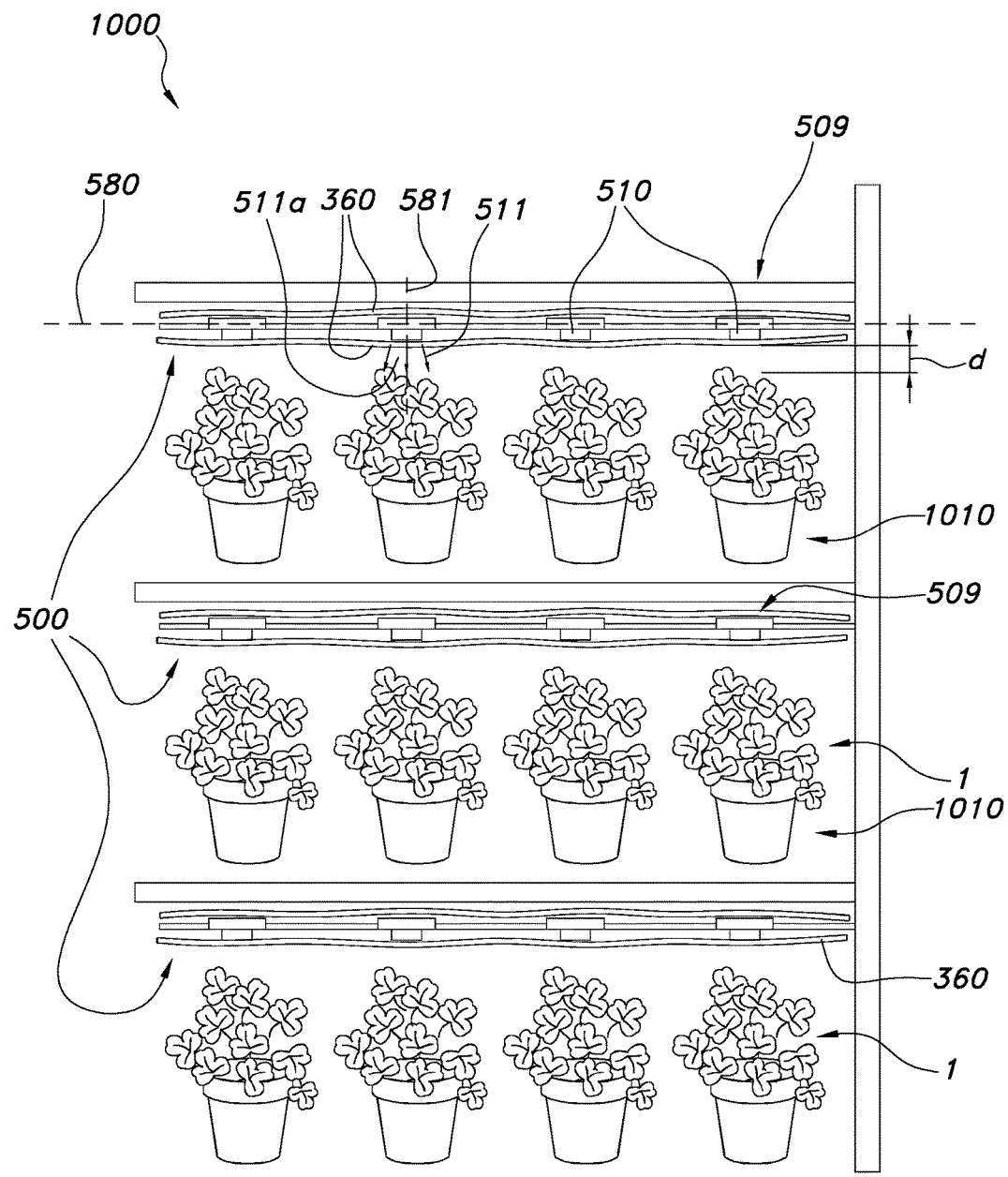

For clarity reasons, FIG. 1b does not show first plant parts, though one may envisage that the shown crops 1 may include first plant parts.

Figure 2D:
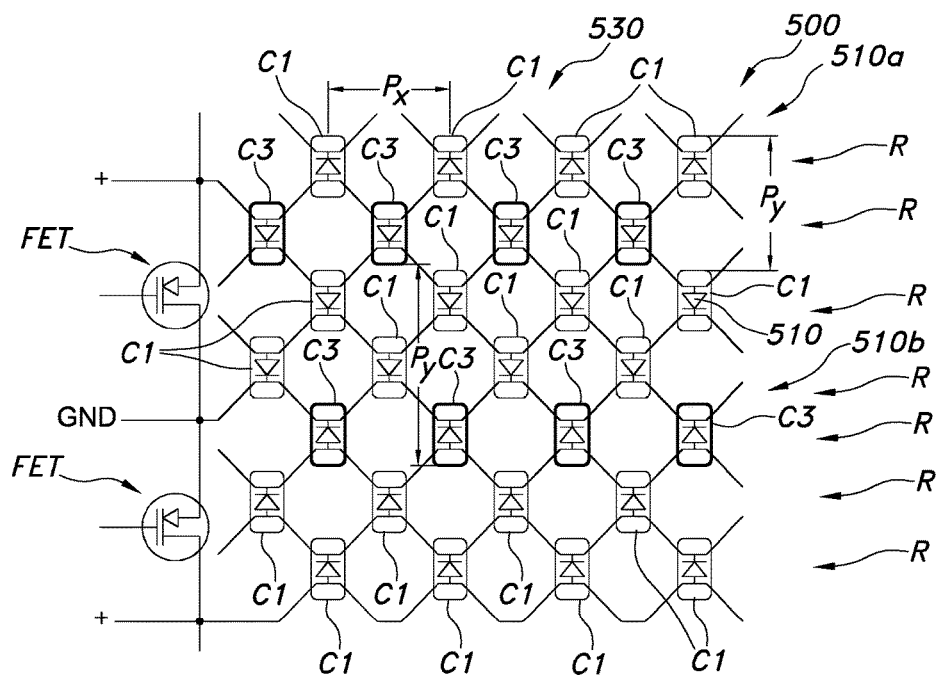

FIG. 1b shows an arrangement for multilayer growth. Plants (e.g. vegetables such as lettuce) are grown on shelves. Close to the plants, a planar supplemental lighting system is located that is designed for providing uniform illumination even when located close to the plants. This is possible when using for example the grid of LEDs ('chicken wire') as depicted in FIG. 2d.

The inventors propose for the lighting devices to have an electronically adjustable fluence (photon concentration) level and spectrum (e.g. ratio red:blue and/or ratio red:far-red). The fluence level and/or the spectrum is made to differ during at least a part of one day during the last 2 weeks before harvesting from that before this time period.

In another embodiment the plants are moved in the multilayer configuration during the different growth stages (e.g. by means of a conveyer belt, or to a different shelf area). In this case the illumination spectrum and fluence at the plants positions corresponding to the last week before harvest is different than the illumination at the other positions in their growth. For example, the plants are moved from a first position equipped with first lighting devices (emitting first fluence and first spectrum during a first period) to second position with second lighting devices, until the $n^{th}$ position with the $n^{th}$ lighting devices. At one of these locations, especially the $n^{th}$ location lighting, the $n^{th}$ lighting devices may provide lighting for enhanced nutrition.

Addition of blue or far-blue (preferably in the range 400 nm-500 nm, more preferred in the range 400 nm-470 nm, most preferred in the range 400 nm-450 nm) or near-UV (300-400 nm range) that is switched on during at least a part of one day during the last week before harvesting helps to stimulate the synthesis of flavonoids and other nutrients. It also helps to kill germs such as fungi and bacteria (such as *E. Coli* and EHEC). For reasons of efficiency, it is preferred that far-blue LEDs emitting around 405 nm are used. In this disclosure, far-blue are the shortest visible wavelengths close to 400 nm, sometimes also referred to as violet.

Figure 1C:
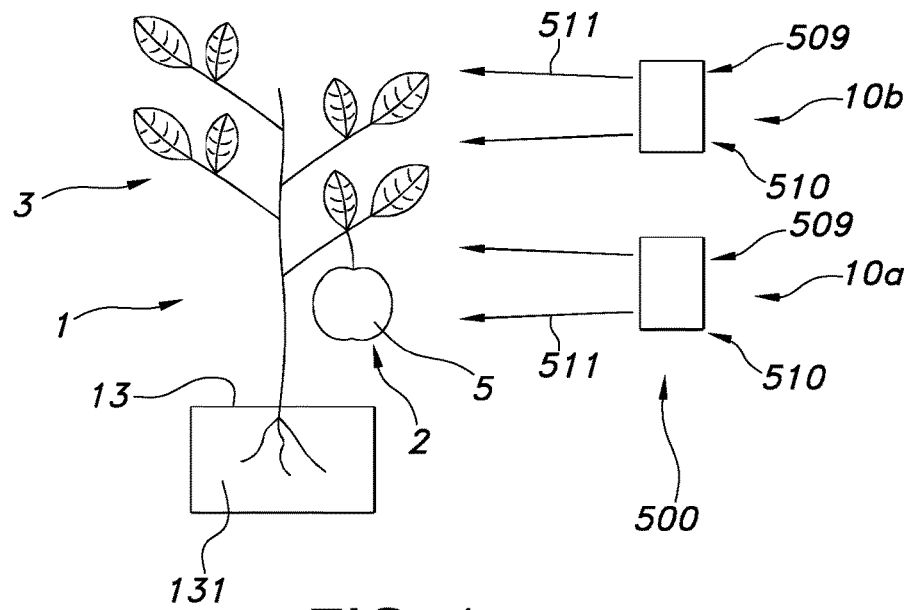
Figure 1D:
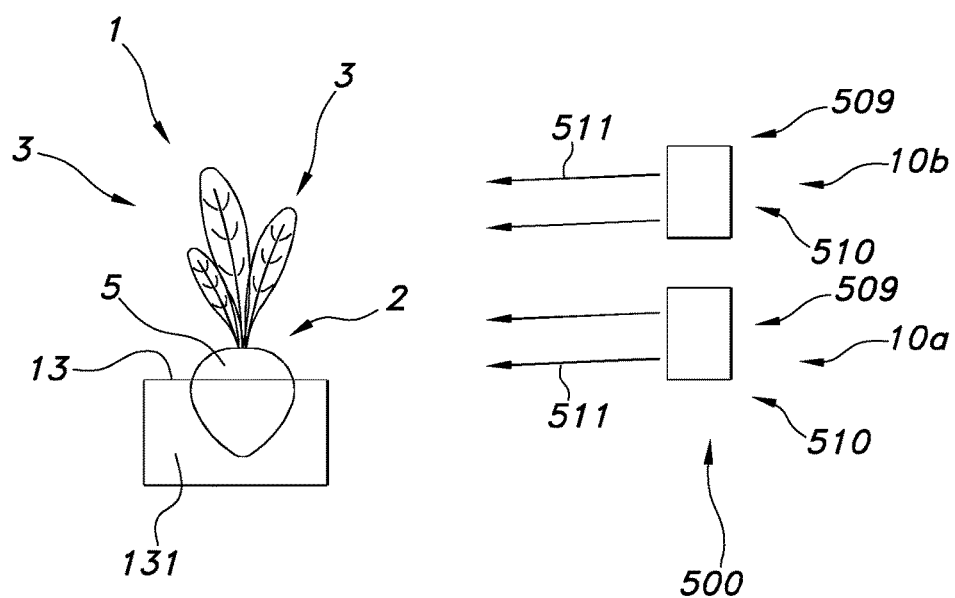

FIG. 1c very schematically depicts an embodiment wherein the lighting device 500 illuminates with a first subset 10a of light source(s) 509 substantially only a target part 5 of the first plant part 2 of the crop 1. Another subset, indicated with reference 10b, also comprising one or more light source(s) 509 substantially illuminates (other) (above-ground) plant parts, which are indicated with reference 3. Reference 13 indicates the surface of a medium 131, such as (potting) soil, in which the crop 1 roots. Whereas FIG. 1c schematically depicts a crop 1 with e.g. a fruit as edible first plant part 2, FIG. 1d schematically depicts a crop, such as a onion, radish, or potato, etc., of which the edible first plant part 2 may be partly above the surface 13 of the medium 131, such as (potting) soil, but also partly within the medium 131. The above-ground plant part 3 of the first plant part 2 may be the target part 5 for illumination (by the first subset 10a) with horticulture light 511 that is chosen to enrich the first plant part 2 with nutrients, whereas optionally one or more of the other above ground parts 3 may be illuminated with horticulture light 511 having another spectral distribution (and/or intensity). For instance, during its lifetime, the crop 1 and first plant part 2 may be illuminated with the same type of light and the same light intensity by the subsets 10a, 10b. However, when the nutritional enhancement lighting period starts, such as two weeks before harvest, the lighting conditions change, and the first plant part is illuminated with light that enhances formation of one or more nutrients, whereas the other plant part(s) 3 are subjected to other conditions. It may also include an increase in intensity for some wavelength ranges relative to the radiation provided to the other plant part(s) 3.

For inter-lighting, as schematically depicted in FIG. 1a, a supplemental lighting device (lighting device) may located in between the plants. The supplemental lighting device may be such that in between the top and the bottom of the plants the light fluence, the spectrum, and the duration can be set independently in at least two height regions (e.g. a lower region and a higher region). These regions may in an embodiment overlap partially. One region may especially overlap with the range of locations of the ripening edible first parts, such as fruits. In an embodiment, the supplemental light fluence in one region can be electronically controlled to differ in time from that in the other regions. Further, additionally or alternatively, the supplemental light spectrum or spectral light distribution (e.g. ratio red:blue and/or ratio red:far-red) in one region can differ in time from that in the other regions. Further, additionally or alternatively, the supplemental light duration in one region can differ from that in the other regions which also holds for pulse time and duration in the case of pulsed lighting. Especially, the light spectrum (e.g. ratio red:blue and/or ratio red:far-red) and fluence level in the region closest to the ripening fruits or other edible first plant parts differs during at least one day during the last two weeks, especially the last week, before harvesting from that in the other regions. Further, additionally or alternatively, the installed or chosen red fluence for the region closest to the ripening edible first plant parts, such as fruits, exceeds that of the other regions. In general, but dependent upon the type of crop, the region closest to the ripening edible first plant parts, such as fruits, is the lowest region. Especially, the installed or chosen fluence in the region closest to the ripening edible first plant parts, such as fruits, in the spectral range from 600-800 nm, especially 600 nm-700 nm exceeds 70 µmol/sec/m². Alternatively or additionally, the installed or chosen fluence in the region closest to the ripening edible first plant parts, such as fruits, in the spectral range from 600-800 nm, especially 600 nm-700 nm exceeds that of the other regions. Alternatively or additionally, the installed or chosen supplemental lighting in the region closest to the ripening edible first plant parts, such as fruits, includes blue or far-blue, preferably in the range 400 nm-500 nm, more preferred in the range 400 nm-470 nm, most preferred in the range 400 nm-450 nm. Alternatively or additionally, especially additionally, the installed or chosen supplemental lighting in the region closest to the ripening edible first plant parts, such as fruits, includes near-UV (300 nm-400 nm range).

For multi-layer lighting, as schematically depicted in FIG. 1b, a supplemental lighting device (system), i.e. lighting device 500, may be located above and especially close to the plants, having preferably an electronically adjustable fluence level and spectrum (e.g. adjustable ratio red:blue and/or ratio red:far-red). The fluence level and/or the spectrum differs during a part of at least one day during the last two weeks, especially during the last week, before harvesting from that before this time period. Especially, addition of blue or far-blue (preferably in the range 400 nm-500 nm, more preferred in the range 400 nm-470 nm, most preferred in the range 400 nm-420 nm) or near-UV (300-400 nm range) may be switched on during a part of at least one day during the last two weeks, especially the last week, before harvesting.

As stated before, in most circumstances all the light is allocated for growth and yield instead of for generating nutrients. To enhance the nutritional value of edible plant parts we grow the edible first plant parts, such as fruits, or vegetables under optimum light conditions for growth and yield and use light for extra nutritional value only during the last days before harvesting. Also, in case of fruit-carrying plants, we aim this light for extra nutritional value mainly at the edible first plant parts, such as fruits.

Further embodiments are schematically depicted in FIGS. 2a-2c. These figures schematically shown lighting devices that are based on a linear array of LEDs emitting a beam in the forward direction. The lighting devices 500 may be located in between two rows of crops (see FIG. 1a). The lighting devices can be arranged horizontally or vertically. The lighting devices have in these embodiments a linear array of LEDs at the front as well as on the back in order to illuminate two opposing rows of crops at the same time.

High-wire crops like tomatoes are harvested at regular time intervals after which the plant is lowered. As a result, new tomatoes grow to maturity at almost the same height from ground level as the previously harvested tomatoes. In other words, the almost full-grown tomatoes are always at the same height range, namely near the lower parts of the plant. This implies that for extra nutritional value we have to direct the supplemental light towards the lower parts of the plant. It should be noted that during periods that daylight is insufficient all leaves are illuminated to participate in the overall plant growth, in which case supplemental lighting has to be provided also to the middle and higher parts of the plant. In this embodiment we therefore have lighting devices in between the top and the bottom of the plants such that the light fluence and the spectrum can be set independently in at least two height regions (e.g. a lower region and a higher region). This can be done in several ways.

For example, in FIG. 2a there is a single lighting device that is vertically oriented but divided into two segments or subsets 10a, 10b that can be addressed individually (in fluence and/or spectrum). In FIG. 2b, two lighting devices that can be addressed individually, which is in fact equivalent to a single lighting device with two subsets of light sources 509, like LEDs. In FIG. 2c, there are three lighting devices, (indicated with references 500(1)-500(3)) which is in fact equivalent to a single lighting device with three subsets of light sources 509, like LEDs that may be arranged in horizontal rows (the rows are indicated with reference R) during application. The lowest one can be addressed separate from the upper two. Note that the lowest one may have an installed ratio of red:blue LEDs that differs from the upper two. Alternatively, the light sources of the subsets of light sources may be addressed individually. This may allow adapting the spectral distribution of the horticulture light to the demand of the crops and/or first plant parts.

Another embodiment according to the invention is shown in FIG. 2d. This embodiment is also applicable to high-wire crops like tomatoes. In FIG. 2d a lighting device is shown which is grid based. The grid combines low or medium power LEDs in a large-area matrix. This matrix consists of a large number of LEDs in a parallel and series configuration. The LEDs are connected by conducting wires or conducting strips, thereby obviating the need for an expensive printed circuit board (PCB). The matrix of interconnections does not hamper the convection of air. It is also largely transparent for light. As depicted in FIG. 2d, by placing the LEDs in sections with opposite polarity, the driving voltage can be kept low and tuned to an optimum value (optimum from the point of energy consumption, cost, and safety for example). With this method, we can scale the matrix to dimensions (in both directions) as large as we want while still keeping the same driving voltage. With the proposed method of connecting the LEDs it is relatively easy to allow for switching or dimming of rows or a combination of rows. In the layout as shown, each combination of three rows of LEDs is addressed individually. This is done by using a switch (e.g. a FET; i.e. field-effect transistor) to short-circuit the constant current supply responsible for that combination of rows. Alternatively, a switch is put in series with each power supply. Dimming of each combination of rows can also be achieved by pulse-width-modulation of the signal at the gate of the FET. In this way we have a lighting device that can be designed such that in between the top and the bottom of the plants the light fluence, the spectrum, and duration can be set independently in at least two height regions.

The LED arrangement again comprises an grid 530 of LEDs 510 (or LED packages) arranged in a matrix, with each LED (or LED package) connected within the matrix by connecting wires. The LED matrix can be scaled in the column direction by increasing or decreasing the number of LEDs in parallel in each bank of the subset of LEDs 510a, 510b.

This scaling enables the LED matrix to be made as large as desired while still keeping the same driving voltage.

Of course, the larger the LED matrix, the larger the driving current. However, this can be achieved by simply using multiple driving supplies, each with a fixed driving voltage range and fixed driving current range, and using as many of these supplies as needed to power the whole array. The different subsets are indicated with references 510a, 510b, etc. By placing the LEDs in sections with opposite polarity, the driving voltage can be kept low and tuned to an optimum value (optimum from the point of energy consumption, cost, and safety for example). In this manner, a modular approach is made possible. Furthermore, there is no need to stitch separate LED grids together as the whole grid can be made in a continuous process. Reference Px and Py indicate the pitch in the x and y-direction, respectively.

The concept disclosed in FIG. 2d can also be used with an implementation of a lighting arrangement as shown in FIG. 2c. With the proposed method of connecting the LEDs it is relatively easy to allow for switching or dimming of rows (or columns) or a combination of rows (or columns). In the layout shown in FIG. 2c, each combination of three rows of LEDs is addressed individually. This can be done by using a switch (e.g. a FET) to short-circuit the constant current supply responsible for that combination of rows. Alternatively, a switch is put in series with each power supply. Dimming of each combination of rows can be achieved by pulse-width-modulation of the signal at the gate of the FET.

In FIG. 2d, rows are indicated with the letter R and differently light emitting LEDs are indicated with C1 and C3, wherein by way of example C1 relates to red and C3 relates to blue. From top to bottom, the 7 rows are red, blue, red, red, blue, red and red light emitting rows that may—dependent upon the construction of the electrical connection—individually be controlled. The rows having the same color may be a single subset, which is controlled, or may include a plurality of the same subsets of which each subset may individually be addressed. Hence, this embodiment, and similar embodiments, allow selecting subsets of one or more rows, which thus also allow—if desired—color selection.

Figure 2E:
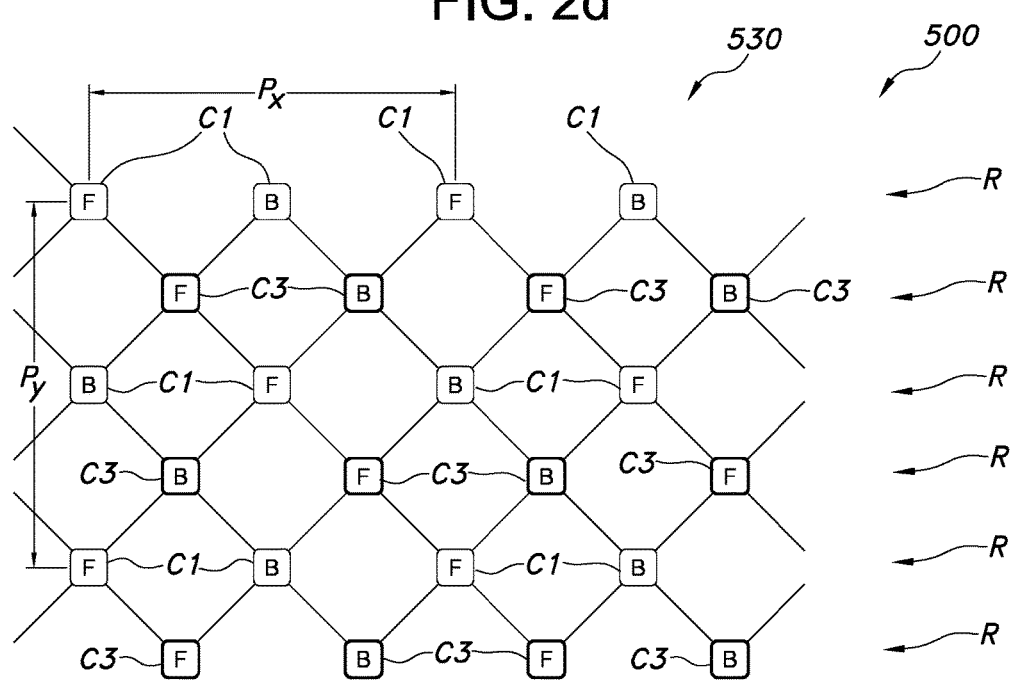

In FIG. 2e we show how we can combine different types of LEDs emitting in different parts of the spectrum into a single grid layout. The layout is such that the sub-grids established by LEDs of the same type is again a regular grid (square or hexagonal), resulting in an optimum uniformity of the produced illumination pattern. Consider for example the red LEDs (C1) emitting in the forward direction (labeled F) in FIG. 2e. They establish a sub-grid that has an LED spacing that is equal for the x direction and y direction (Px and Py in FIG. 2e are equal). This is a prerequisite for obtaining a uniform illumination distribution (which is in general desired, although the lighting device may also comprises layers of subsets (see also above)). In FIG. 2e, rows R of blue (C3) and red (C1) LEDs alternate; further LED's 510 emitting to one side and emitting to another side alternate. The reference "F" refers to forward emission, and the reference "B" refers to backward emission.

The LED grid can also be covered with a thin transparent plastic layer (e.g. by immersion in a plastic pre-cursor or resin that is (then) cured by UV radiation). Alternatively, the transparent layer can be formed by molding a transparent material (e.g. Silicone) over the LED grid structure (see also e.g. FIGS. 1b, 2f-2i).

FIGS. 2f and 2g schematically depict such LED grid 530 embedded in a foil 360, wherein in FIG. 2f all LEDs 510 provide light (when driven) in one direction, away of the first side 361, and wherein in FIG. 2g, the LEDs 510 are configured to provide light (when driven) in both directions, i.e. away from the first side 361 and away from the second side 362. The LEDs are therefore also indicated with the letter F and B respectively. A double sandwich construction, combining two separate LED grids into one, is shown in FIG. 2h. A mounting arrangement for an LED grid in a greenhouse is shown in FIG. 2i. Reference 526 indicates a mounting bracket, and reference 527 indicates a counter weight. Of course, other configurations such as frames may be possible as well. In all FIGS. 2f-2i the LEDs 510 are configured to provide the horticulture light 511 in beams of light having optical axes 581 configured perpendicular to said grid plane 580. However, in FIGS. 2g and 2h, one or more subsets of LED(s) 510 are configured to provide beams of light in an opposite direction to the LED(s) 510 of one or more other subsets. This leads to the LEDs 510 being indicated with Bs and Fs.

At present, post-harvest use of lighting for improving the nutritional value is not used. In our opinion this is caused by the lack of methods and means to provide lighting to fruits and vegetables post-harvest in an efficient way. After harvesting, fruits and vegetables, or other edible plant parts such as described above, are stored in containers. Containers for fruits and vegetables have a certain size. This size should be small enough in order for the fruits, or other edible plant parts such as described above, on the bottom not to get damaged by the fruits on top of them (considering gravity). Also, practical reasons determine the size of a container.

These reasons cause that during storage, containers will have to be stacked to efficiently fill storage space. This implies that there is no way to provide supplemental lighting to the fruits and vegetables, or other edible plant parts such as described above, inside such containers during storage. Also during storage and display in supermarkets, it is hardly possible for supplemental lighting to reach the bottom of a container.

Hence, it is a further aim to provide a solution for these kind of problems.

In a further aspect, this disclosure also provides a container for storing fruits or vegetables, or other edible plant parts such as described above. The inners walls of the container may be equipped with LEDs emitting light towards the content of the container. In an embodiment, the container contains an LED driver.

Especially, the container is provided with one or more connectors at the top and bottom of the container, configured to relay power from this container to a container stacked on top of it or vice versa.

In an embodiment, the LEDs are arranged in a grid with interconnecting wires (such as e.g. described above). Both the LEDs and the interconnecting wires may be integrated in the walls of the container.

In an embodiment, the LEDs in the container are configured to provide radiation in one or more of the red (especially peak wavelength at 660±20 nm), far-red (especially 730±20 nm), and blue (especially 450±20 nm). Preferably, all three wavelength ranges are represented. Even more especially, also far-blue (405±20 nm) or UV-A (300-400 nm) is included.

In an embodiment, the illumination level generated by the LEDs installed in the container, at the location inside the container where the illumination level is highest, may be set as follows:

for wavelengths longer than 425 nm: this value can exceed 10 µmol/sec/m$_2$ and does preferably not exceed 250 µmol/sec/m$^2$;

for wavelengths shorter than 425 nm: this value can exceed 1 µmol/sec/m$^2$ and does preferably not exceed 100 µmol/sec/m$^2$.

In an embodiment, the container is equipped with a controller. Additionally or alternatively, the container may be equipped with a sensor, such as one or more of a temperature sensor, a colour sensors, and an ethylene sensor. Optionally, (during use) a disposable optically transparent layer may be configured in between the container and the fruits or vegetables. The layer has a transmission coefficient exceeding 60%, for at least the above indicated wavelength ranges when such radiation is actually applied in such container (during use).

Figure 3A:
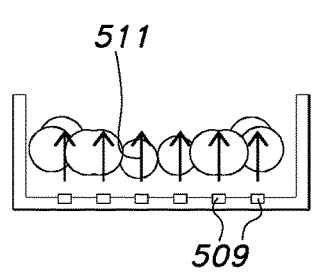
FIGS. 3a-3d schematically depict some other aspects.

Some embodiments are schematically shown in FIGS. 3a-3d. FIG. 3a shows a container 400 (in this context a container refers to any 'component that can contain fruits or vegetables inside it') that has a bottom that has embedded in it light sources 509, especially LED-based means for generating light. The light is directed towards the fruits and vegetables stored inside the container. The light is indicated with reference 511, as it is also considered to be horticulture light.

Figure 3C:
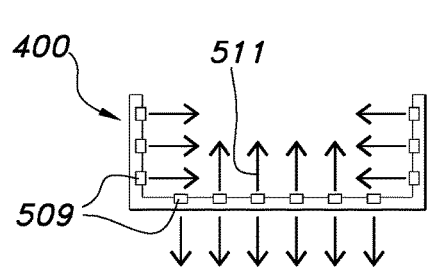
Figure 3B:
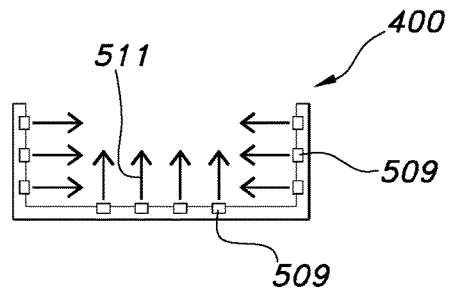

In an embodiment, as shown in FIG. 3b, also the side walls of the container can be made to emit light, as they also may optionally comprise light sources 509.

In FIG. 3c, the bottom of the container is configured to also emit light downwards (assuming this container can be stacked onto another container).

Figure 3D:
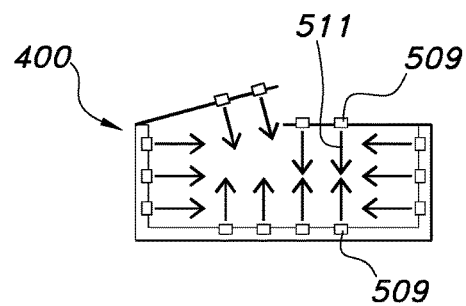

FIG. 3d shows an embodiment wherein also the lid of the container 400 can be equipped with means to emit light (note that the lid can also be located on one of the sides). Hence, also a closure part, such as a movable lid, may be configured to provide horticulture light inside the container 400 and/or to an adjacent container 400.

Horticulture light emitted into the container may be scattered by the fruits or vegetables present in the container and hence reaches a substantial part of the content of the container.

Figure 4A:
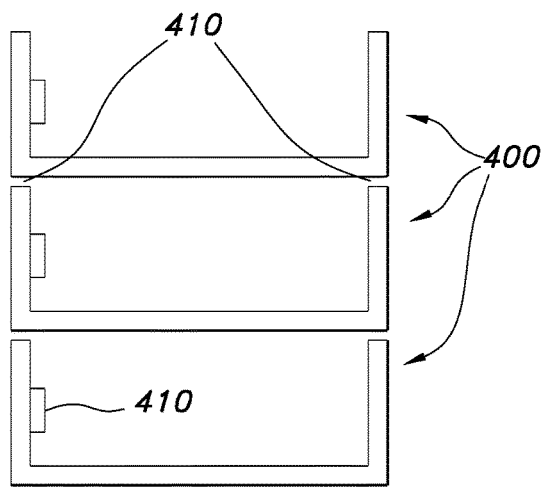
FIGS. 4a-4b schematically depict some other aspects.
Figure 4B:
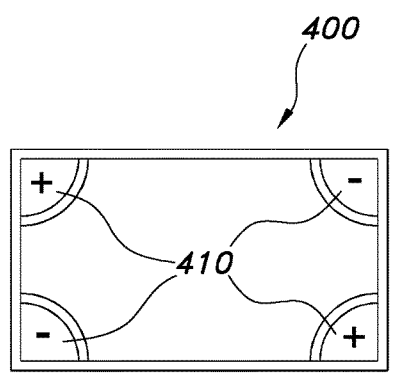

Further embodiments are schematically depicted in FIGS. 4a-4b and 5a-5b. These embodiments relate to methods of providing electrical power to the containers 400 and to relaying power in between containers 400. As shown in FIG. 4a (side view), each container 400 can have its own power connector, indicated with reference 410. However, having power cables to each container separately would in many cases become impractical and lead to cluttering of the space by power cables. To this end, the containes 400 may comprise power connectors 410 between containers, which are configured to transfer power between containers 400 that are adjacent. These power connectors of adjacent containers may be in physical contact which each other, but in another embodiment, wireless electrical energy transfer from one container to another container may be used. Especially, these power connectors 410 may be configured at the corners, see FIG. 4b (top view). A non-limiting example of the polarity of the connectors is indicated in this figure.

These drawings are only schematic drawings of possible embodiments; other embodiments may also be possible. For instance, for non-square containers the different polarities can be installed of the long or the short side of the containers (horizontal cross-section). In the extreme case they can indeed be at the corners. In an embodiment, each of the polarities is assigned to one of the sides, such as e.g. + is always assigned to the longer side(s), and the − is always assigned to the shorter side(s). This allows an easy arrangement of containers on top of each other.

Figure 5A:
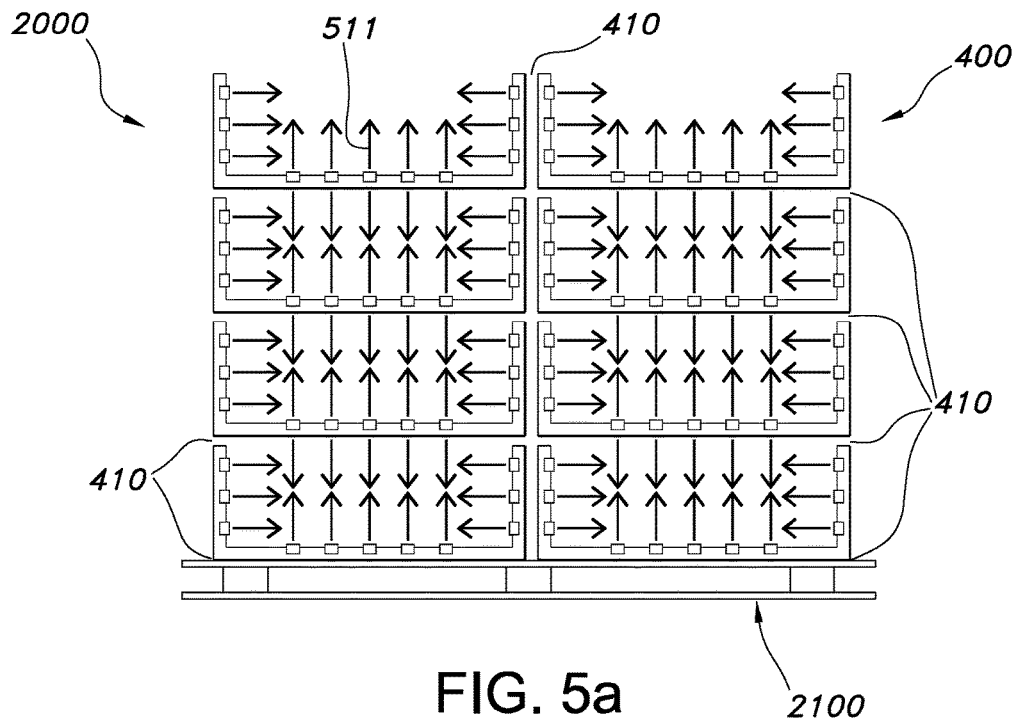
FIGS. 5a-5b schematically depict some other aspects; The drawings are not necessarily to scale.
Figure 5B:
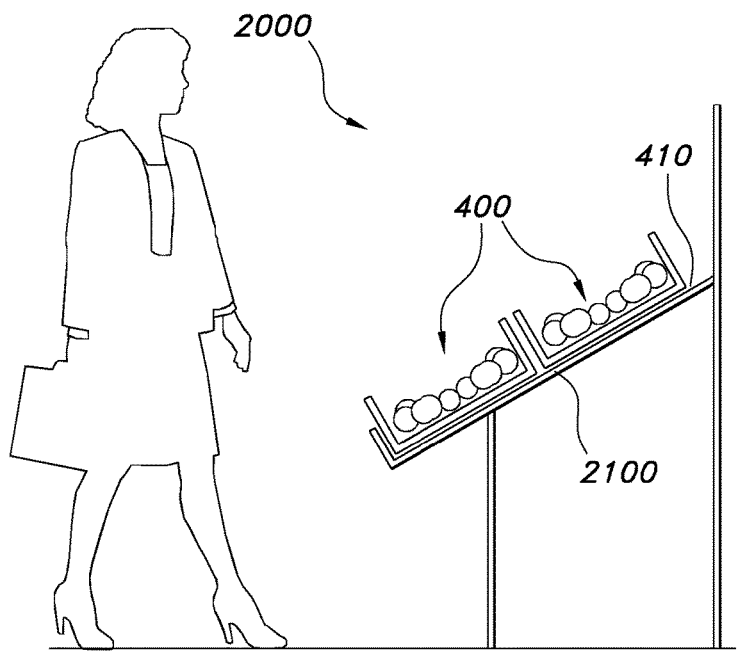

To make it more practical, we propose that containers that are stacked on top of each other are able to relay power from one container to the other in the same stack. A method of how to implement this is shown in FIGS. 5a and 5b: at the corners at the top and bottom of each container there is a connector to relay power to a container adjacent to it. The polarities are chosen such that the interconnection becomes fool-proof. Reference 2000 indicates an application of containers which have inward and/or downward horticulture lighting functionalities. Reference 2100 indicates a support, in FIG. 5a a pallet, that may optionally be equipped with electrical power options to power the container(s) 400 on the support 2100. Hence, as in many cases containers 400 are stacked onto a pallet. An option is therefore to relay power from the pallet to the containers in closest contact with the pallet, as depicted in FIG. 5a.

Yet another option is to have a wireless power transfer. An embodiment related to this is shown in FIG. 5b (but, as indicated above, may also apply to other herein described or depicted embodiments). Depicted is a typical situation in a supermarket where containers with fruits or vegetables are located on a shelf. This support is again indicated with reference 2100. A convenient way of powering the light sources, especially the LED lighting, inside the container is by means of wireless power transfer from the shelf to the container. Since the top surface of the shelf and the bottom surface of the container are flat and in very close contact, this power transfer can be done very efficient. The wireless power transfer can be based on well-known principles of inductive or capacitive coupling or a combination of both.

In an embodiment, also the LED driver and any control electronics may be embedded inside a wall of the container 400.

The light source 509 which may be comprised, such as embedded, by the container walls (including an optional movable lid, etc.), may be part of a grid as described and/or depicted above.

Apart from LEDs and their driver, containers can also be equipped with a controller. Such a controller can include an address. In this way containers can be addressed individually (e.g. by means of power-line communication). The system of containers with their LEDs, drivers and controllers can be combined with sensors that can detect properties of the fruits and vegetables. Examples of such sensors are:

Temperature sensor to monitor the temperature inside the container in order to be able to, for example, dim the LEDs in case they produce too much heat.

Sensors to detect ripening (e.g. a colour sensor or a sensor that detects ethylene, which is an indicator for ripening of fruit).

There can be two-way communication between the container and the outside world (e.g. a master controller) by means of power-line communication. The containers can be equipped with (re-programmable) RFID tags and static memory that can be read out to convey information on the LED lighting system embedded into the container (e.g. installed LEDs, installed power, operating voltage, year of manufacture, etc.). Each container can be equipped with a switch to manually override electronically switching on/off the LED lighting. Instead of a 2-dimensional grid of LEDs to provide a surface that more or less uniformly emits light, one can also use a planar light-guide that is edge-lit (as used in backlights for LCD TVs). Instead of inorganic LEDs, also organic LEDs (OLEDs) can be used.

Figure 6:
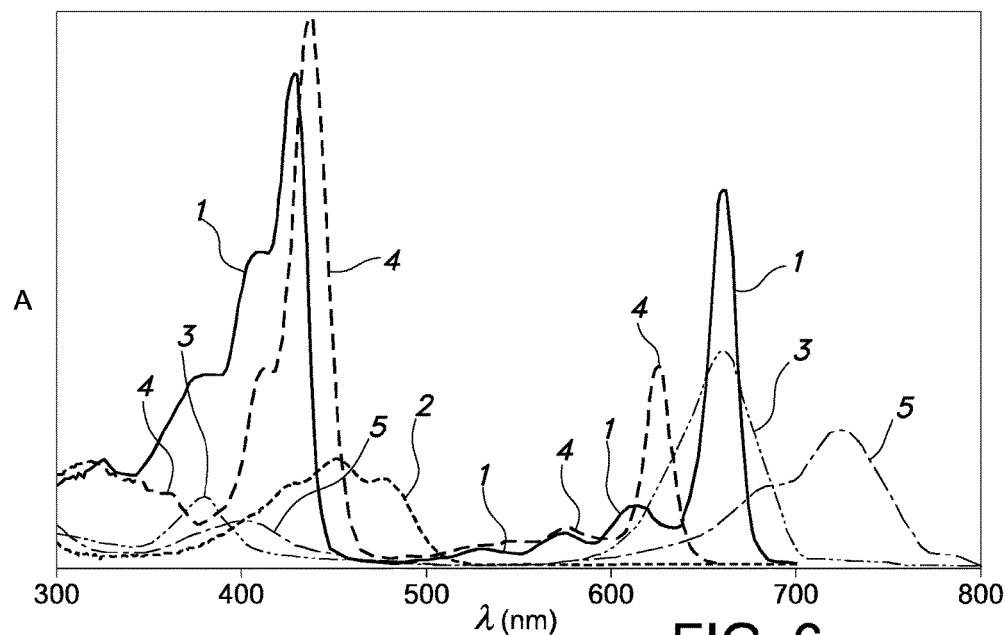
FIG. 6 depicts relative absorption spectra of some common photoreceptors in green plants.

FIG. 6 depicts relative absorption spectra of some common photoreceptors in green plants, with 1 representing chl a, 2 representing Beta carotene, 3 representing phytochrome (Pr), 4 representing chl b, and 5 representing phytochrome (Pfr). On the x-axis the wavelength is represented and on the y-axis the absorption of those photoreceptors (in arbitrary units). This invention can be applied in horticulture for providing supplemental illumination to high-wire crops like tomatoes as well as multi-layer lighting in plant factories (in other words, this invention can be applied in a major part of the horticulture market).

Herein, we present an LED-based supplemental lighting device for e.g. high-wire crops in green houses as well as for multi-layer growth in plant factories. The lighting devices are applicable to most of the horticulture market. For high-wire crops, the lighting devices provide lighting in between the rows of the plants, i.e. there where they receive a relatively low amount of natural light.

The lighting devices may be based on grids of LEDs that may in an embodiment be transparent for light, non-obstructive for air, emit towards both sides, and have a topology of connecting wires that allows combining and selecting different colors of LEDs at different heights while still resulting in a uniform illumination. The method as disclosed represents a low-cost solution for horticulture.

EXAMPLE

In order to validate that exposing fruits to relatively high fluences of light during the last weeks before harvesting promotes the synthesis of extra nutrients, the inventors performed an experiment on tomatoes.

In the experiment, for two varieties of tomatoes, a few trusses of tomatoes where shielded from the ambient light by means of a PVC tube. On the inner side of the tube, red and blue LEDs were mounted. These LEDs illuminate only the tomatoes and not any leaves of the plant.

Figure 7:
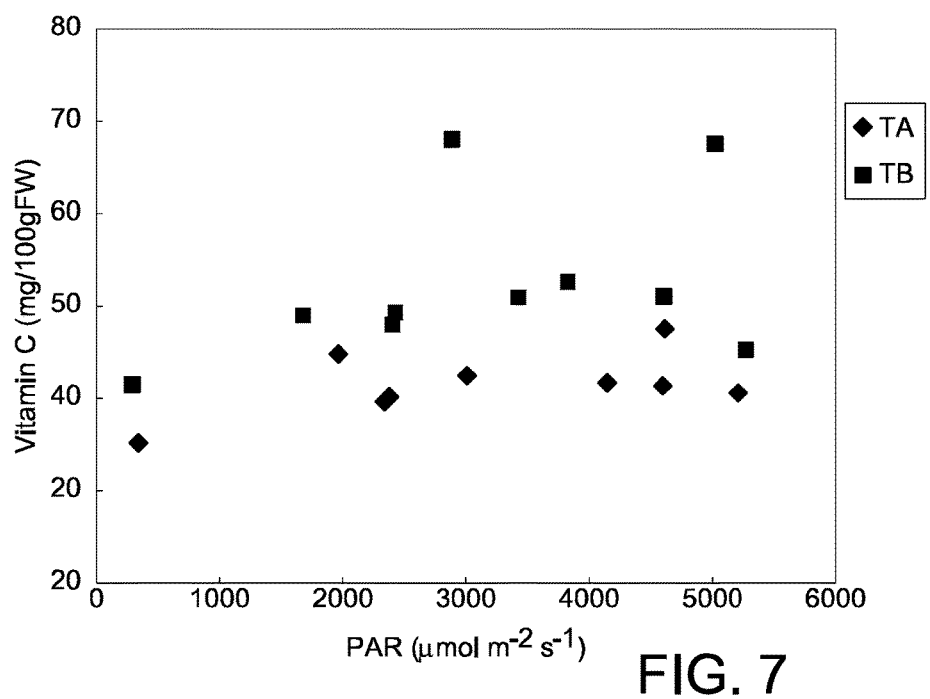
FIG. 7 depicts results of an experiment.

FIG. 7 displays the results from the experiment. For two varieties of tomatoes, we found that exposing the tomatoes (not the leaves) to at least 300 µmol/sec/m$^2$ for at least 1 week results in a doubling of the vitamin C content compared to the reference normal harvest (indicated by the small arrows close to the vertical axis of the graph).

The system of luminaires with their drivers and controllers can be combined with sensors that can detect the ripening of the fruits. Such sensors can be based on the detection of ethylene or be camera-based. The detection of ripening can then be used for timing of the supplemental light meant to increase the nutritional value. Further, instead of applying supplemental lighting for nutrition enhancement before harvesting, it can also be used post-harvesting. For example, pick tomatoes (green, orange, red) and illuminate them for 3 days with predominantly red light.

The invention claimed is:

1. A method for enhancing the nutritional value in a plant part of a crop, wherein a first plant part of a crop comprises an edible plant part, wherein the crop in addition to the first plant part comprises one or more other plant parts, wherein the method comprises:
    illuminating during the crop a lighting period, wherein light is provided for a predetermined time to enhance the nutritional value of a target part of said first plant part with light that is selected to enhance formation of a nutrient in said first plant part;
    allowing one or more other plant parts to be subjected to different light conditions, wherein the lighting period is started at a predetermined start time wherein the first plant part receives during the lighting period light with a at least one of different spectral wavelength distribution and intensity than the one or more other plant parts; and
    wherein the method comprises providing said light to said target part with a photosynthetic photon flux density (PPFD), as measured in number of photons per second per unit of area of at least 50 µmol/sec/m$^2$.

2. The method according to claim 1, wherein the light has a spectral light distribution with at least light intensity at a wavelength selected from one or more of the ranges of 300-475 nm and 600-800 nm.

3. The method according to claim 1, wherein the light has a spectral light distribution with light intensity at a first wavelength selected from the range of 300-475 nm and at a second wavelength selected from the range of 600-800 nm.

4. The method according to claim 3, wherein a ratio of photosynthetic photon flux densities (PPFD) of blue light to red light of the light illuminating said target part of said first plant part is in the range of 1:2-1:50, with red and blue ranging from 625-675 nm and from 400-475 nm, respectively.

5. A method for enhancing the nutritional value in a plant part of a crop, wherein a first plant part of a crop comprises an edible plant part, wherein the crop in addition to the first plant part comprises one or more other plant parts, wherein the method comprises:
    illuminating during the crop a lighting period, wherein light is provided for a predetermined time to enhance the nutritional value of a target part of said first plant part with light that is selected to enhance formation of a nutrient in said first plant part; while
    allowing one or more other plant parts to be subjected to different light conditions, wherein the lighting period is started at a predetermined start time wherein the first plant part receives during the lighting period light with a at least one of different spectral wavelength distribution and intensity than the one or more other plant parts; and
    wherein the light has a spectral light distribution with at least light intensity at a wavelength selected from the range 625-675 nm, and wherein a photosynthetic photon flux density (PPFD) as measured in number of photons per second per unit of area, to which the target part is exposed, is in the range of 100-400 µmol/sec/m$^2$ within said wavelength range.

6. The method according to claim 5, wherein the light is supplemental light in addition to existing lighting by one or more of daylight and artificial light.

7. The method according to claim 6, wherein the method comprises sensing a status of the first plant part and based thereon determining the start of the lighting period.

8. The method according to claim 7, wherein the method comprises starting the lighting period one week before the predetermined harvest of the first plant part, based on the status.

9. A method for enhancing the nutritional value in a plant part of a crop in a horticulture application, wherein first plant parts of a plurality of crops comprises an edible plant parts, wherein the crops in addition to the first plant parts comprises one or more other plant parts, wherein the method comprises:
- illuminating the crops during a lighting period, wherein lighting is provided for a predetermined time to enhance the nutritional value of a target part of said first plant parts with horticulture light that is selected to enhance formation of a nutrient in said first plant parts;
- allowing one or more other plant parts to be subjected to different light conditions, wherein the lighting period is started at a predetermined time wherein the first plant parts receive during the lighting period light with a at least one of different spectral wavelength distribution and intensity than the one or more other plant parts, and
- illuminating the plant parts with the horticulture light of a lighting device which is at least partly arranged between the plurality of crops, and wherein the first plant parts are a fruit or vegetable selected from the group consisting of a flower bud, a seed, a tuber, a whole plant sprout, a root, a bulb, a legume, a botanical fruit that is used as a culinary vegetable, and a culinary fruit; and
- wherein the lighting period is started at predetermined start time based on an estimated harvest of the first plant part or an evaluation of a status of the crop and/or the first plant part.

10. The method according to claim 9, further including the step of applying light, using the lighting device comprising a plurality of light sources arranged in 2D array comprising rows of light sources, wherein one or more rows of light sources are configured to provide during said lighting period horticulture light, that has higher light intensity at a first wavelength selected from the range of 300-475 nm and at a second wavelength selected from the range of 600-800 nm than one or more other rows of light sources during said lighting period.

11. The method according to claim 9, further including the step of applying light, using the wherein the lighting device is configured to provide during said lighting period light having a spectral light distribution with at least light intensity at a first wavelength selected from the range of 300-475 nm and at a second wavelength selected from the range of 600-800 nm, wherein during said lighting period one or more rows provide light having a different intensity in one or more of said wavelength ranges, than one or more other rows, and wherein the one or more other rows provide during said nutritional enhancement lighting period light having a spectral light distribution with at least light intensity at a first wavelength selected from the range of 625-700 nm.

12. A method for enhancing the nutritional value in a plant part of a crop, wherein a first plant part of a crop comprises an edible plant part, wherein the crop in addition to the first plant part comprises one or more other plant parts, wherein the method comprises:
- illuminating during the crop a lighting period, wherein light is provided for a predetermined time to enhance the nutritional value of a target part of said first plant part with light that is selected to enhance formation of a nutrient in said first plant part; while
- allowing one or more other plant parts to be subjected to different light conditions, wherein the lighting period is started at a predetermined start time wherein the first plant part receives during the lighting period light with a at least one of different spectral wavelength distribution and intensity than the one or more other plant parts; and
- wherein the lighting period is started at predetermined start time based on an estimated harvest of the first plant part or an evaluation of a status of the crop and/or the first plant part.

* * * * *